United States Patent Office 2,864,818
Patented Dec. 16, 1958

2,864,818

Δ⁵-11,16,20-TRIKETO-PREGNENE 3-KETALS AND PROCESS

Glen E. Arth, Cranford, N. J., George I. Poos, Ambler, Pa., and Lewis H. Sarett, Princeton, N. J., assignors to Merck & Co., Inc., Rahway, N. J., a corporation of New Jersey No Drawing. Application December 31, 1956
Serial No. 631,489

6 Claims. (Cl. 260—239.55)

This invention is concerned generally with dimethylcyclopentanopolyhydrophenanthrene compounds and with processes for preparing them. More particularly, it relates to a novel process for preparing Δ⁴-3,11,20-triketopregnene starting with 1-alkoxyethinyl-1-hydroxy-2-methallyl - 2,4b - dimethyl - 4 - keto - 1,2,3,4,4a,4b,5,6,7,8, 10,10a-dodecahydrophenanthrene compounds having in the 7-position a ketal or other substituent convertible to keto by hydrolysis, to the individual steps in this process, and to the intermediate compounds thus obtained.

This application is a continuation-in-part of our co-pending application Serial No. 310,133, now abandoned, filed September 17, 1952.

The Δ⁴-3,11,20-triketo-pregnene, which is valuable as an intermediate in the preparation of steroid hormones such as cortisone, may be chemically represented as follows:

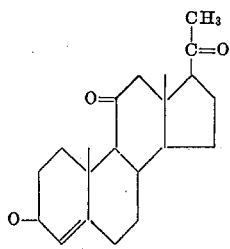

The 1 - alkoxyethinyl - 1 - hydroxy - 2 - methallyl - 2,4b - dimethyl - 4 - keto - 1,2,3,4a,4b,5,6,7,8,10,10a - dodecahydrophenanthrene, having in the 7-position a ketal substituent hydrolyzable to a 7-keto grouping, used as starting material in our novel process, may be chemically represented as follows:

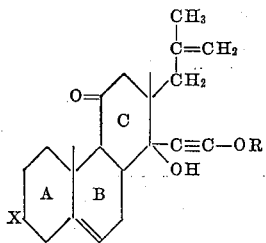

wherein R is alkyl, and X may be

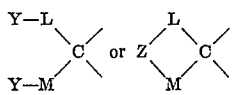

Y₁ and Y₂ being hydrocarbon radicals, L and M being oxygen or sulfur, and Z being alkylene. In each of the process operations utilized by us in preparing Δ⁴-3,11,20-triketopregnene, the keto group in ring A is blocked with a ketal or cyclic ketal protecting group. At any stage in the process, this keto group may be regenerated by acid hydrolysis whereby the ketal substituent, which includes the simple ketals, thioketals, hemithioketals, cyclic ketals grouping, cyclic thioketals and cyclic hemithioketals, is hydrolyzed and, at the same time, the double bond shifts from ring B to ring A thus forming a α,β-unsaturated ketone. We ordinarily prefer to utilize an ethylene-dioxy substituent as the protecting group, and our preferred starting material is therefore 1-alkoxyethinyl-1-hydroxy-2 - methallyl - 2,4b - dimethyl - 4 - keto - 7 - ethylenedioxy - 1,2,3,4,4a,4b,5,6,7,8,10,10a - dodecahydrophenanthrene.

Utilizing the latter compound as starting material, and in accordance with our presently invented process, 1-alkoxyethinyl - 1 - hydroxy - 2 - methallyl - 2,4b - dimethyl - 4 - keto - 7 - ethylenedioxy - 1,2,3,4,4a,4b,5,6, 7,8,10,10a - dodecahydrophenanthrene (Compound 1 hereinbelow) is reacted with a dilute aqueous mineral acid solution to produce the corresponding 1-carboalkoxymethylene - 2 - methallyl - 2,4b - dimethyl - 4 - keto - 7 - ethylenedioxy - 1,2,3,4,4a,4b,5,6,7,8,10,10a - dodecahydrophenanthrene (Compound 2); the latter compound is reacted with an alkaline saponifying agent thereby forming 1 - carboxymethylene - 2 - methallyl - 2,4b - dimethyl - 4 - keto - 7 - ethylenedioxy - 1,2,3,4,4a,4b,5,6,7,8,10,10a - dodecahydrophenanthrene (Compound 3). The 1-carboxymethylene - 2 - methallyl - 2,4b - dimethyl - 4 - keto - 7 - ethylenedioxy - 1,2,3,4,4a,4b,5,6,7,8,10,10a - dodecahydrophenanthrene is then reacted with an alkali metal in a lower alkanol or in liquid ammonia to produce 1-carboxymethyl - 2 - methallyl - 2,4b - dimethyl - 4 - hydroxy - 7 - ethylenedioxy - 1,2,3,4,4a,4b,5,6,7,8,10,10a - dodecahydrophenanthrene (Compound 4). Alternatively, this reduction operation, which involves the reduction of both the C-4 keto group to hydroxy and the 1-carboxymethylene radical to a carboxymethyl grouping, can be carried out step-wise by reacting the 1-carboxymethylene-2-methallyl - 2,4b - dimethyl - 4 - keto - 7 - ethylenedioxy -1,2,3, 4,4a,4b,5,6,7,8,10,10a - dodecahydrophenanthrene with an alkali metal borohydride or alkaline earth metal borohydride to form the corresponding 1-carboxymethylene-2-methallyl - 2,4b - dimethyl - 4 - hydroxy - 7 - ethylenedioxy - 1,2,3,4,4a,4b,5,6,7,8,10,10a - dodecahydrophenanthrene (Compound 5); the latter compound is reacted with an alkali metal in a lower alkanol or in liquid ammonia to produce 1-carboxymethyl-2-methallyl-2,4b-dimethyl - 4 - hydroxy - 7 ethylenedioxy - 1,2,3,4,4a,4b,5, 6,7,8,10,10a - dodecahydrophenanthrene (Compound 4). This compound is reacted with an esterifying agent, preferably an alkyl iodide in the presence of a base and/or a diazoalkane to produce the corresponding 1 - carboalkoxymethyl - 2 methallyl - 2,4b - dimethyl - 4 - hydroxy-- 7 - ethylenedioxy - 1,2,3,4,4a,4b,5,6,7,8,10,10a - dodeca - hydrophenanthrene (Compound 6). This compound is reacted with an oxidizing agent, preferably under alkaline conditions, thereby forming the corresponding 1-carboalkoxymethyl - 2 - methallyl - 2,4b - dimethyl - 4 - keto - 7 - ethylenedioxy - 1,2,3,4,4a,4b,5,6,7,8,10,10a - dodecahydrophenanthrene (Compound 7); alternatively, 1-carboxymethyl - 2 - methallyl - 2,4b - dimethyl - 4 - hydroxy - 7 - ethylenedioxy - 1,2,3,4,4a,4b,5,6,7,8,10,10a - dodecahydrophenanthrene can be reacted with an oxidizing agent to produce 1 - carboxymethyl - 2 - methallyl - 2,4b -dimethyl - 4 - keto - 7 - ethylenedioxy - 1,2,3,4,4a,4b,5,6,7, 8,10,10a - dodecahydrophenanthrene (Compound 8), which is then reacted with an esterifying agent to form the corresponding 1-carboalkoxymethyl-2-methallyl-2,4b-dimethyl - 4 - keto - 7 - ethylenedioxy - 1,2,3,4,4a,4b,5,6, 7,8,10,10a - dodecahydrophenanthrene (Compound 7). The latter compound is reacted with osmium tetroxide to form the osmate ester of 1 - carboalkoxymethyl - 2 - (beta,gamma - dihydroxyisobutyl) - 2,4b - dimethyl - 4 - keto - 7 - ethylenedioxy - 1,2,3,4,4a,4b,5,6,7,8,10,10a - dodecahydrophenanthrene (Compound 9), which is reacted with an aqueous alcoholic solution of an alkali metal sulfite or bisulfite to produce the corresponding 1-carboalkoxymethyl - 2 - (beta,gamma - dihydroxy - isobutyl) - 2,4b - dimethyl - 4 - keto - 7 - ethylenedioxy - 1,2,3,4,4a,4b,5,6,7,8,10,10a - dodecahydrophenanthrene compound (Compound 10); the 1 - carboalkoxymethyl - 2 - (beta,gamma - dihydroxyisobutyl) - 2,4b - dimethyl - 4 - keto - 7 - ethylenedioxy - 1,2,3,4,4a,4b,5,6,7,8,10,10a - dodecahydrophenanthrene is reacted with periodic acid to form the corresponding 1 - carboalkoxymethyl - 2 - acetonyl - 2,4b - dimethyl - 4 - keto - 7 - ethylenedioxy - 1,2,3,4,4a,4b,5,6,7,8,10,10a - dodecahydrophenanthrene (Compound 11). Alternatively, the 1 - carboalkoxymethyl - 2 - methallyl - 2,4b - dimethyl - 4 - keto - 7 - ethylenedioxy - 1,2,3,4,4a,4b,5,6,7,8,10,10a - dodecahydrophenanthrene (Compound 7) can be reacted with ozone followed by hydrolysis of the ozonide thereby forming directly the corresponding 1 - carboalkoxymethyl - 2 - acetonyl - 2,4b - dimethyl - 4 - keto - 7 - ethylenedioxy - 1,2,3,4,4a,4b,5,6,7,8,10,10a - dodecahydrophenanthrene (Compound 11). The latter compound is reacted, under substantially anhydrous conditions, with a strong alkali thereby forming $\Delta^5$ - 3 - ethylenedioxy - 11,16,20 - triketo - pregnene (Compound 12). The $\Delta^5$ - 3 ethylenedioxy - 11,16,20 - triketo - pregnene is reacted with an organic sulfonyl halide thereby forming the corresponding sulfonate ester of $\Delta^{5,16}$ - 3 - ethylenedioxy - 11,20 - diketo - 16 - hydroxy - pregnadiene (Compound 13), which is reacted with hydrogen in the presence of a hydrogenation catalyst to produce $\Delta^5$ - 3 - ethylenedioxy - 11,20 - diketo - pregnene (Compound 14). The $\Delta^5$ - 3 - ethylenedioxy - 11,20 - diketo - pregnene is then reacted with an aqueous mineral acid solution whereupon the ethylenedioxy substituent attached to the 3-carbon atom is hydrolyzed and, at the same time, the double bond shifts from ring B to ring A to form $\Delta^4$ - 3,11,20 - triketo - pregnene (Compound 15).

The reactions indicated herein above may be chemically represented as follows:

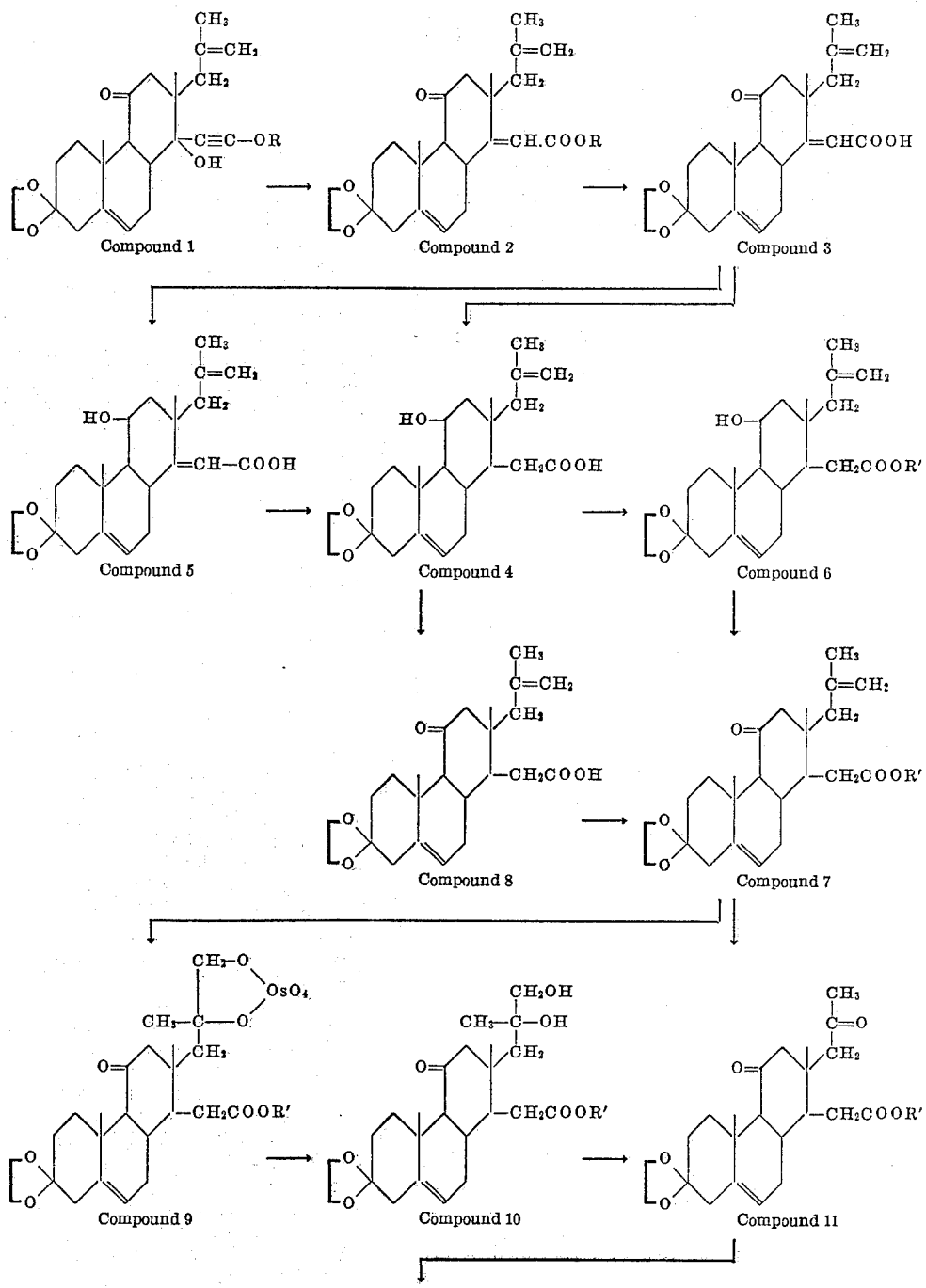

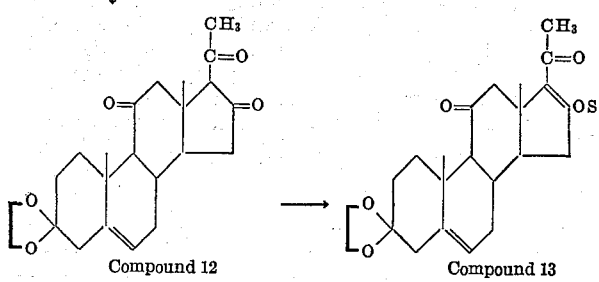

Compound 12 → Compound 13

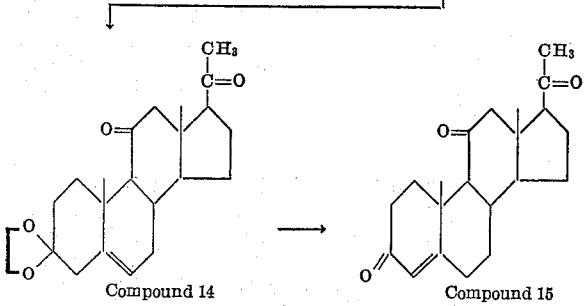

Compound 14 → Compound 15 wherein R and R' are alkyl radicals and R'' is an organic radical.

Although in the foregoing series of reactions, the substituent in ring A of the polyhydrophenanthrene nucleus is shown as an ethylenedioxy grouping, instead of ethylenedioxy, any ketal substituent including simple ketals, thioketals, hemithioketals, cyclic ketals, cyclic thioketals, and cyclic hemithioketals can be used as the protecting grouping. In place of a ketal substituent, an enol-ether may be used as the protecting group, if desired. Accordingly, instead of 1 - alkoxyethinyl - 1 - hydroxy - 2 - methallyl - 2,4b - dimethyl - 4 - keto - 7 - ethylenedioxy - 1,2,3,4,4a, 4b,5,6,7,8,10,10a - dodecahydrophenanthrene, and 1 - alkoxyethinyl - 2 - (allyl or alkallyl) - 2,4b - dimethyl - 4 - keto - 1,2,3,4,4a,4b,5,6,7,8,10,10a - dodecahydrophenanthrene compound, having in the 7-position a ketal substituent (including simple ketals, thioketals, hemithioketals, cyclic ketals, cyclic thioketals, and cyclic hemithioketals) hydrolyzable to a 7-keto grouping, may be used as starting material in the presently invented process. In each of the process operations utilized by us in preparing $\Delta^4$ - 3,11,20 - triketo - pregnene, the keto group in ring A is blocked by a ketal protecting group (as above defined). At any stage in the process, this keto group may be regenerated by acid hydrolysis whereby the ketal group is hydrolyzed and, at the same time, the double bond shifts from ring B to ring A thus forming an $\alpha,\beta$-unsaturated ketone. It is ordinarily preferred to utilize an ethylenedioxy substituent as the protecting group, and our preferred starting material is 1-alkoxyethinyl-1-hydroxy - 2 - methallyl - 2,4b - dimethyl - 4 - keto - 7 - ethylenedioxy - 1,2,3,4,4a,5,6,7,8,10,10a - dodecahydrophenanthrene.

This 1 - alkoxyethinyl - 1 - hydroxy - 2 - methallyl - 2,4b - dimethyl - 4 - keto - 7 - ethylenedioxy - 1,2,3,4, 4a,4b,5,6,7,8,10,10a - dodecahydrophenanthrene is a new compound which may be prepared according to the following procedure: β-ethoxy-propionaldehyde is reacted with ethyl magnesium bromide to produce 1-ethoxy-3-hydroxy - pentane which is reacted with chromic acid thereby oxidizing the hydroxy substituent to form 1-ethoxy-3-keto-pentane; the latter compound is treated with ethyl ortho formate and ethanol in the presence of hydrogen chloride to produce 1,3,3 - triethoxy - pentane which, upon reaction with hot potassium bisulfate, is converted to 3-ethoxy-1,3-pentadiene. The 3-ethoxy-1,3-pentadiene is reacted with benzoquinone in accordance with the Diels-Alder condensation procedure to produce 5 - methyl - 6 - ethoxy - 1,4,4a,5,8,8a - hexahydronaphthalene - 1,4 - dione which is then reacted with hydrogen in the presence of Raney nickel catalyst to form 5-methyl - 6 - ethoxy - 1,2,3,4,4a,5,8,8a - octahydronaphthalene - 1,4 - dione; the latter compound is reacted with lithium aluminum hydride to form the corresponding diol, 5 - methyl - 6 - ethoxy - 1,2,3,4,4a,5,8,8a - octahydronaphthalene - 1,4 - diol which is reacted with a hydrolyzing agent to produce 5 - methyl - 6 - ketoperhydronathalene - 1,4 - diol. The reactions indicated above are described in detail in a co-pending application of one of the present applicants, Serial No. 216,109, filed March 16, 1951, now abandoned. The 5 - methyl - 6 - ketoperhydronaphthalene - 1,4 - diol is then reacted with N- (3 - keto - butyl) - N,N - diethyl - N - methylammonium iodide in the presence of potassium hydroxide to produce 7 - keto - 4b - methyl - 1,2,3,4,4a,4b,5,6,7,9,10,10a - dodecahydrophenanthrene - 1,4 - diol; this reaction is described in detail in co-pending application, Serial No. 228,126, filed May 24, 1951, now U. S. Patent No. 2,617,828. The 7 - keto - 4b - methyl - 1,2,3,4,4a,4b, 5,6,7,9,10,10a - dodecahydrophenanthrene - 1,4 - diol is reacted with ethylene glycol in ethylene dichloride solution and in the presence of p-toluene sulfonic acid catalyst thereby forming 1,4 - dihydroxy - 4b - methyl-7-ethylenedioxy - 1,2,3,4,4a,4b,5,6,7,8,10,10a - dodecahydrophenanthrene. The 1,4 - dihydroxy - 4b - methyl - 7 - ethylenedioxy - 1,2,3,4,4a,4b,5,6,7,8,10,10a - dodecahydrophenanthrene is reacted with cyclohexanone and aluminum isopropoxide in benzene solution to produce the corresponding 1 - keto - 4 - hydroxy - 4b - methyl - 7 - ethylenedioxy - 1,2,3,4,4a,4b,5,6,7,8,10,10a - dodecahydrophenanthrene. The reactions indicated hereinabove are described in detail in a co-pending application of the present applicants, Serial No. 286,808, filed May 8, 1952, now abandoned.

The 1 - keto - 4 - hydroxy - 4b - methyl - 7 - ethylenedioxy - 1,2,3,4,4a,4b,5,6,7,8,10,10a - dodecahydrophenanthrene is reacted with methyl iodide in the presence of potassium tertiary butoxide in benzene thereby forming 1 - keto - 2,4b - dimethyl - 4 - hydroxy - 7 - ethylenedioxy-1,2,3,4,4a,4b,5,6,7,8,10,10a - dodecahydrophenanthrene; the latter compound is reacted with chromium trioxide-pyridine complex to form 1,4-diketo-2,4b-dimethyl-7-ethylenedioxy - 1,2,3,4,4a,4b,5,6,7,8,10,10a - dodecahydrophenanthrene. The methylation reaction indicated hereinabove is described in detail in a co-pending application in which one of the present applicants is co-inventor, Serial No. 306,488, filed August 26, 1952, now abandoned. The oxidation reaction indicated hereinabove is described in detail in a co-pending application in which one of the present applicants is the sole inventor, Serial No. 292,985, filed June 11, 1952. The 1,4-diketo-2,4b-dimethyl - 7 - ethylenedioxy - 1,2,3,4,4a,5,6,7,8,10,10a-dodecahydrophenanthrene is reacted with methallyl iodide in a tertiary butyl alcohol solution of aluminum tertiary butylate, thereby forming 1,4-diketo-2-methallyl-2,4b-dimethyl - 7 - ethylenedioxy - 1,2,3,4,4a,4b,5,6,7,8,10,10a-dodecahydrophenanthrene. The latter compound is reacted in ether-benzene solution with an alkoxy acetylene magnesium bromide to produce the corresponding 1-alkoxy - ethinyl - 1 - hydroxy - 2 - methallyl - 2,4b - dimethyl - 4 - keto - 7 - ethylenedioxy - 1,2,3,4,4a,4b,5,6,7,8,10,10a-dodecahydrophenanthrene.

Alternatively, the 1 - keto - 2,4b - dimethyl - 4 - hydroxy - 7 - ethylenedioxy - 1,2,3,4,4a,4b,5,6,7,8,10,10a-dodecahydrophenanthrene is reacted with methallyl iodide in a tertiary butyl alcohol solution of aluminum tertiary butylate to produce 1-keto-2-methallyl-2,4b-dimethyl-4-hydroxy - 7 - ethylenedioxy - 1,2,3,4,4a,4b,5,6,7,8,10,10a-dodecahydrophenanthrene which, upon reaction with an alkoxy acetylene magnesium bromide in ether-benzene solution, is converted to the corresponding 1-alkoxyethinyl-1,4 - dihydroxy - 2 - methallyl - 2,4b - dimethyl - 7-ethylenedioxy - 1,2,3,4,4a,4b,5,6,7,8,10,10a - dodecahydrophenanthrene. The reactions indicated hereinabove are described in detail in two co-pending applications of the present applicants, Serial No. 306,509, filed August 26, 1952, now abandoned, and Serial No. 308,172, filed September 5, 1952, now abandoned. Where it is desired to utilize another cyclic ketal or other ketal substituent (as defined above) or an enol-ether substituent to protect the 7 - keto grouping, this is introduced in the foregoing procedure by reacting the intermediate 1,4-dihydroxy - 7 - keto - 4b - methyl - 1,2,3,4,4a,4b,5,6,7,9,10,10a - dodecahydrophenanthrene under substantially anhydrous conditions and in the presence of an acid catalyst, with a lower alkanol, propanol, butanol, and the like, or an excess of another low molecular weight glycol such as propylene glycol, butylene glycol, or an excess of a thioglycol or dithioglycol such as ethanedithiol, propane-1,2-dithiol, β - mercapto-ethanol, β - mercapto - propanol, and the like. If it is desired to use an enol-ether as the protecting group, the 1,4-dihydroxy-7-keto-4b-methyl-1,2,3,4,4a,4b,5,6,7,9,10,10a - dodecahydrophenanthrene is reacted, under substantially anhydrous conditions in the presence of an acid catalyst with an alkyl ortho formate.

The rearrangement of the 1-alkoxyethinyl-1-hydroxy-2-methallyl - 2,4b - dimethyl - 4 - keto - 7 - ethylenedioxy-1,2,3,4,4a,4b,5,6,7,8,10,10a - dodecahydrophenanthrene, its 2-allyl and 2-alkallyl homolog, and other 7-ketals thereof, is carried out by bringing this compound into intimate contact with an aqueous mineral acid in solution in an organic solvent for the compound, for example a cyclic ether such as tetrahydrofuran, tetrahydropyran, dioxane or an alkanol such as ethanol, isopropanol, butanol and the like, under which conditions the ketal or enol ether substituent attached to the C-7-carbon atom is not appreciably hydrolyzed. We ordinarily utilize tetrahydrofuran as the organic solvent in conjunction with 10% aqueous sulfuric acid solution, and allow the slightly exothermic reaction which takes place to proceed at a temperature of about 25–30° C. Under these conditions, the reaction is ordinarily complete in about three and one-half hours. In accordance with this procedure, there is obtained the desired 1-carboalkoxymethylene-2-methallyl-2,4b - dimethyl - 4 - keto - 7 - ethylenedioxy - 1,2,3,4,4a,4b,5,6,7,8,10,10a - dodecahydrophenanthrene admixed with a by-product, 1-carboalkoxymethyl - 1 - hydroxy - 2 - methyl - 2,4b - dimethyl - 4 - keto - 7 - ethylenedioxy-1,2,3,4,4a,4b,5,6,7,8,10,10a - dodecahydrophenanthrene. These two products can be conveniently isolated from the reaction mixture by neutralizing the mineral acid with a mildly aqueous alkaline solution, preferably a saturated aqueous solution of sodium bicarbonate, distilling the organic solvent under reduced pressure, and extracting the oil which separates during distillation into the ether. After washing, drying and evaporating the ether extract, there is obtained a residual oily material from which it is possible to fractionally crystallize the foregoing components in substantially pure form. It is ordinarily preferred, however, to separate these two products in pure form by chromatography on acid-washed alumina. This is accomplished by dissolving the residual oily material in benzene-petroleum ether, contacting this solution with acid-washed alumina and eluting the adsorbate with a mixture of petroleum ether-ether. From the eluates richer in the petroleum ether component is obtained the 1 - carboalkoxymethylene - 2 - methallyl - 2,4b - dimethyl-4 - keto - 7 - ethylenedioxy - 1,2,3,4,4a,4b,5,6,7,8,10,10a-dodecahydrophenanthrene and from the following fractions which contain a relatively higher proportion of ether is obtained the 1 - carboalkoxymethyl - 1 -hydroxy - 2-methallyl - 2,4b - dimethyl - 4 - keto - 7 - ethylenedioxy-1,2,3,4,4a,4b,5,6,7,8,10,10a-dodecahydrophenanthrene.

The saponification of the ester grouping in the 1-carboalkoxymethylene-2-methallyl-2,4b-dimethyl-4- - keto - 7-ethylenedioxy-1,2,3,4,4a,4b,5,6,7,8,10,10a - dodecahydrophenanthrene is conducted utilizing an alkaline hydrolyzing agent since the 7-position substituent is unstable under the conditions normally encountered in the acid hydrolysis of esters. The hydrolysis is conveniently carried out utilizing an aqueous methanolic solution containing postassium carbonate and a small amount of potassium hydroxide, but other alkaline hydrolyzing agents can be utilized if desired. When this preferred hydrolyzing agent is utilized, saponification may be carried out at room temperature, or more rapidly, if desired, by heating the reactants at the reflux temperature of the solution. The methanol is evaporated under reduced pressure, and the aqueous mixture diluted with approximately an equal volume of water, whereupon the potassium salt of 2-carboxylmethylene-2-methallyl-2,4b-dimethyl-4-keto-7-ethylenedioxy - 1,2,3,4,4a,4b,5,6,7,8,10,10a-dodecahydrophenanthrene may precipitate as an oil. The aqueous solution or suspension is then extracted with ether, and the aqueous mixture is acidified with a mildly acidic reagent such as sodium dihydrogen phosphate. The acidic material which separates is extracted with chloroform, the chloroform extracts are dried and evaporated under reduced pressure to give 1-carboxymethylene-2-methallyl-2,4b-dimethyl-4-keto - 7 - ethylenedioxy-1,2,3,4,4a,4b,5,6,7,8,10,10a - dodecahydrophenanthrene. This material may be further purified by washing with ether and recrystallizing the material from ethyl acetate.

As set forth herein above, the 1-carboxymethylene-2-methallyl-2,4b-dimethyl-4-keto-7-ethylenedioxy-1,2,3,4,4a,4b,5,6,7,8,10,10a-dodecahydrophenanthrene can be converted directly to 1-carboxymethyl-2-methallyl - 2,4b - dimethyl-4-hydroxy-7-ethylenedioxy - 1,2,3,4,4a,4b,5,6,7,8,10,10a-dodecahydrophenanthrene by reaction with an alkali metal, such as sodium, lithium, or potassium, or this reaction can be carried out in two operations, first reducing the 4-kote substituent to hydroxy utilizing an alkali metal borohydride such as sodium borohydride, lithium borohydride, potassium borohydride or an alkaline earth metal borohydride such as calcium borohydride, and then reducing the 1-carboxymethylene substituent utilizing the alkali metal.

The reaction between the 1-carboxymethylene-2-methallyl-2,4b-dimethyl-4-keto-7-ethylenedioxy-1,2,3,4,4a,4b,5, 6,7,8,10,10a-dodecahydrophenanthrene and the alkali metal borohydride or alkaline earth metal borohydride is conducted by suspending the hydrophenanthrene compound in water or in aqueous organic solvent such as aqueous tetrahydrofuran, aqueous dioxane, aqueous alkanole, and the like, and adding the alkali metal or alkaline earth metal borohydride cautiously to the mixture. After all the reducing agent has dissolved, the resulting mixture is allowed to stand preferably at a temperature between about room temperature and 100° C., although higher and lower temperatures may be used if desired. When the reaction is carried out at a temperature of about 30° C., the reaction is ordinarily complete after a reaction time of about 24 hours. The aqueous mixture is carefully acidified, preferably maintaining the pH above about 3.5; it is preferred to utilize sodium dihydrogen phosphate for this acidification. The product which precipitates is extracted with an organic solvent such as chloroform. The chloroform extracts are washed, dried and evaporated in vacuo to give an oil which can be crystallized from ether to give crystalline 1-carboxymethylene-2-methallyl-2,4b-dimethyl-4-hydroxy-7-ethylenedioxy - 1,2,3,4,4a,4b,5, 6,7,8,10,10a-dodecahydrophenanthrene.

The latter product or, if desired, the starting 1-carboxymethylene-2-methallyl-2,4b-dimethyl-4-keto-7 - ethylenedioxy-1,2,3,4,4a,4b,5,6,7,8,10,10a-dodecahydrophenanthrene is reacted with an alkali metal such as metallic lithium, sodium or potassium, and the like, in solution in a lower alkanol and/or in liquid ammonia.

Where metallic lithium or potassium are used as the reducing agents, it is preferred to use liquid ammonia. The reaction system which has been found most advantageous is potassium-liquid ammonia-isopropanol. The reaction between the 1-carboxymethylene-2-methallyl-2,4b-dimethyl-4-(keto or hydroxy)-7-ethylenedioxy-1,2,3,4,4a,5,6,7,8,10,10a-dodecahydrophenanthrene and metallic lithium or potassium is conveniently carried out by suspending the hydrophenanthrene compound in liquid ammonia and adding the alkali metal portion-wise to the suspension. If desired, a lower alkanol such as ethanol, butanol, and the like may be added to the reaction mixture; although the reduction reaction will occur in the absence of the alkanol, the yield of the desired product is improved, in some cases, by the use of the alkanol. The liquim ammonia reaction mixture is stirred at the boiling point of liquid ammonia until the ammonia has evaporated. The crude reaction mixture is treated with benzene, and, if necessary, a small amount of ethyl acetate or alcohol is added to destroy the excess alkali metal. The resulting mixture is then diluted with water, the benzene layer is discarded, and the alkaline layer containing the reduction product is solidified. The material which precipitates is extracted with chloroform, and the chloroform extract is washed, dried and evaporated. The oily material thus obtained is crystallized by heating with ether to give crude 1-carboxymethyl-2-methallyl-2,4b-dimethyl-4-hydroxy-7-ethylenedioxy - 1,2,3,4,4a,5,6,7,8,10, 10a-dodecahydrophenanthrene.

When sodium or potassium is used as the reducing agent, the reaction is conveniently carried out by bringing together the 1-carboxymethylene-2-methallyl-2,4b-dimethyl-4-(keto or hydroxy)-7-ethylenedioxy,1,2,3,4,4a,4b, 5,6,7,8,10,10a-dodecahydrophenanthrene, alkali metal, and a hot lower alkanol, and stirring the resulting mixture under reflux for a period of about fifteen minutes. The reaction mixture is evaporated to about one-half volume in vacuo, diluted with water and the aqueous solution is carefully acidified. The acidic aqueous mixture is extracted with chloroform, and the chloroform extract is dried and evaporated in vacuo. The residual material consists of crude 1-carboxymethyl-2-methallyl-2,4b-dimethyl-4-hydroxy-7-ethylenedioxy - 1,2,3,4,4a,5,6,7,8,10, 10a-dodecahydrophenanthrene.

When the reduction is carried out utilizing as starting material the 1-carboxymethylene-2-methallyl-2,4b-dimethyl-4-keto-7-ethylenedioxy-1,2,3,4,4a,5,6,7,8,10,10a-dodecahydrophenanthrene, there may be obtained, in addition to the 1-carboxymethyl-2-methallyl-2,4b-dimethyl-4-hydroxy-7-ethylenedioxy-1,2,3,4,4a,4b,5,6,7,8,10,10a-dodecahydrophenanthrene, a small amount of 1-carboxymethyl-2-methallyl-2,4b-dimethyl-4-keto-7-ethylenedioxy-1,2,3,4,4a, 4b,5,6,7,8,10,10a-dodecahydrophenanthrene.

Esterification of the 1-carboxymethyl-2,4b-dimethyl-4-(hydroxy or keto)-7-ethylenedioxy-1,2,3,4,4a,4b,5,6,7,8, 10,10a-dodecahydrophenanthrene can be carried out by any of the usual methods of esterification but, in view of the ease of hydrolysis of the metal substituent in the 7-position, it is ordinarily preferred to conduct this esterification under alkaline conditions using a diazoalkane or an alkyl iodide in the presence of a base as the esterifying agent. The reaction utilizing a diazoalkane such as diazomethane or diazoethane is conveniently carried out by dissolving the 1-carboxymethyl-2-methallyl-2,4b-dimethyl-4-(hydroxy or keto) - 7 - ethylenedioxy-1,2,3,4,4a,4b,5,6, 7,8,10,10a-dodecahydrophenanthrene in an organic solvent such as ether and adding to this solution an excess of the diazoalkane in an inert organic solvent medium such as ether. The resulting solution is allowed to stand at approximately room temperature until the evolution of nitrogen ceases, the solvents are evaporated, and the residual oil is crystallized to give 1-carboalkoxymethyl-2-methallyl-2,4b-dimethyl-4-(hydroxy or keto)-7-ethylenedioxy - 1,2,3,4,4a,4b,5,6,7,8,10,10a - dodecahydrophenanthrene.

The 1-carboalkoxymethyl-2-methallyl-2,4b-dimethyl-4-hydroxy - 7 - ethylenedioxy-1,2,3,4,4a,4b,5,6,7,8,10,10a-dodecahydrophenanthrene can be converted by reaction with an oxidizing agent to the corresponding 4-keto derivative, which is alternatively obtained by the esterification of the 1-carboalkoxymethyl-2-methallyl-2,4b-dimethyl - 4 - keto - 7 - ethylenedioxy - 1,2,3,4,4a,5,6,7,8,10, 10a-dodecahydrophenanthrene as described hereinabove. As oxidizing agent for this reaction, we ordinarily prefer to utilize chromium trioxide-pyridine complex, although other oxidizing agents such as chromic acid may be employed if desired. Using the preferred oxidant, the 1-carboalkoxymethyl - 2 - methallyl - 2,4b - dimethyl - 4-hydroxy - 7 - ethylenedioxy -,1,2,3,4,4a,4b,5,6,7,8,10,10a-dodecahydrophenanthrene is dissolved in pyridine and mixed with the complex formed by adding chromium trioxide to an excess of pyridine. The resulting mixture is allowed to stand at a temperature within the range of about 0° C. to 100° C. for a period of time, depending upon the temperature; at room temperature, the reaction is ordinarily complete in about 15 hours. The reaction mixture is diluted with water and the aqueous solution is extracted with a water-immiscible organic solvent such as ether. The organic solvent extracts are washed with water, dried, and the solvent evaporated. The residual oil is crystallized to give 1-carboalkoxymethyl-2-methallyl-2,4b - dimethyl - 4 - keto - 7 - ethylenedioxy - 1,2,3,4,4a, 4b,5,6,7,8,10,10a-dodecahydrophenanthrene.

Further oxidation of the latter compound converts the methylene substituent in the methallyl radical to a keto grouping. This can be accomplished in a two-stop oxidation utilizing osmium tetroxide followed by periodic acid or in a single-step utilizing ozone. Where the osmium tetroxide procedure is used, the 1-carboalkoxymethyl-2-methally - 2,4b - dimethyl - 4 - keto - 7 - ethylenedioxy-1,2,3,4,4a,4b,5,6,7,8,10,10a-dodecahydrophenanthrene is dissolved in a dry ether benzene solution and approximately one equivalent of osmium tetroxide is added to the solution. In a few minutes the osmate ester of the 1 - carboalkoxymethyl - 2 - (beta,gamma - dihydroxyisobutyl) - 2,4b - dimethyl - 7 - ethylenedioxy - 1,2,3,4,4a, 4b,5,6,7,8,10,10a-dodecahydrophenanthrene precipitates, and the resulting mixture is allowed to stand at about room temperature for a period of about one hour. At the end of this period, the reaction is substantially complete. An organic solvent for the osmate ester, for example a lower alkanol such as ethanol, or a cyclic ether such as tetrahydrofurane is added to the reaction mixture to dissolve the osmate ester, and the latter is reacted with a mildly alkaline hydrolyzing agent under reducing conditions such as an aqueous solution of an alkali metal sulfite or bisulfite. The osmium oxide which precipitates from the hydrolysis is removed by filtration, and the filtered solution is evaporated under reduced pressure. The residual oily material thus obtained is shaken with a mixture of ether and water, the ethereal extract is washed with water, dried and evaporated to give crystalline 1 - carboalkoxymethyl-2-(beta,gamma-dihydroxyisobutyl) - 2,4b - dimethyl - 4 - keto - 7 - ethylenedioxy-1,2,3,4,4a,4b,5,6,7,8,10,10a-dodecahydrophenanthrene.

The 1 - carboalkoxymethyl-2-(beta,gamma-dihydroxyisobutyl) - 2,4b - dimethyl - 4 - keto - 7 - ethylenedioxy-1,2,3,4,4a,4b,5,6,7,8,10,10a-dodecahydrophenanthrene is dissolved in an organic solvent for the compound for example a lower alkanol, such as ethanol, and a cyclic ether, such as tetrahydrofuran and the like, and to this solution are added pyridine and an aqueous solution of periodic acid. The glycol cleavage which takes place is ordinarily complete in a few minutes. The reaction mixture is diluted with water, and the aqueous reaction mixture is extracted with an organic solvent such as ether. The organic solvent extract is washed, dried, and evaporated to give an oily product which can be crystallized to give substantially pure 1-carboalkoxymethyl-2-acetonyl-2,4b - dimethyl - 4 - keto - 7 - ethylenedioxy - 1,2,3,4,4a, 4b,5,6,7,8,10,10a-dodecahydrophenanthrene.

When the conversion of the 2-methallyl substituent to an acetonyl radical is conducted utilizing ozone instead of osmium tetroxide followed by periodic acid, the 1-carboalkoxymethyl - 2 - methallyl - 2,4b - dimethyl - 4-keto - 7 - ethylenedioxy - 1,2,3,4,4a,4b,5,6,7,8,10,10a-dodecahydrophenanthrene is dissolved in a lower alkanol such as methanol, the solution is cooled to a low temperature of about —80° C., and ozonized oxygen containing one equivalent of ozone based on the hydrophenanthrene compound is passed through the solution. The resulting mixture is warmed to approximately 0° C., and the ozonide product in the reaction mixture is decomposed under reductive conditions either by means of a small amount of zinc and aqueous acetic acid, or catalytically by contacting the ozonide in an aqueous medium with hydrogen and a platinum catalyst. When the ozonide is reacted with zinc and aqueous acetic acid, the reaction mixture is made slightly alkaline, filtered and the solvents evaporated therefrom in vacuo at a temperature below about 20° C. The residual material is extracted with ether, the ethereal solution is chromatographed on acid-washed alumina and the alumina-adsorbate is eluted utilizing ether-petroleum ether. Upon evaporation of the ether-petroleum ether eluate, there is obtained 1-carboalkoxymethyl - 2 - acetonyl - 2,4b - dimethyl - 4 - keto - 7-ethylenedioxy - 1,2,3,4,4a,4b,5,6,7,8,10,10a - dodecahydrophenanthrene.

We then prepare a substantially anhydrous solution of 1 - carboalkoxymethyl-2-acetonyl-2,4b-dimethyl-4-keto-7 - ethylenedioxy - 1,2,3,4,4a,4b,5,6,7,8,10,10a-dodecahydrophenanthrene in an aromatic hydrocarbon such as benzene, toluene, and the like. This solution is brought into contact with a solid anhydrous, strongly basic material, for example an alkali metal alkoxide, such as sodium methoxide, potassium t-butoxide, an alkali metal, such as metallic sodium, an alkali metal hydride, such as sodium hydride, an alkali metal amide such as sodamide, and the like. The resulting mixture is ordinarily stirred at a temperature within the range of about 20 to 50° C. although temperatures somewhat below or above this range may be used, if desired. When the reaction is carried out at about room temperature, the cyclization is substantially complete in approximately ten hours. The reaction mixture is poured into water and immediately acidified with an excess of a mildly acidic reagent such as an aqueous solution of primary sodium phosphate. The acidified solution is extracted with an organic solvent such as chloroform and the solvent extract dried, filtered and evaporated to give crystalline $\Delta^5$-3-ethylenedioxy-11,16,20-triketo-pregnene, which can be further purified if desired by recrystallization. Acid hydrolysis of the $\Delta^5$-3-ethylenedioxy-11,16,20-triketo-pregnene gives $\Delta^4$-3,11,16,20-tetraketo-pregnene.

The $\Delta^5$ - 3 - ethylenedioxy - 11,16,20-triketo-pregnene is then reacted with an organic sulfonyl chloride, preferably p-toluene sulfonyl chloride. This reaction is carried out dissolving the pregnene compounds in a tertiary amine such as pyridine and adding the organic sulfonyl chloride to the resulting solution. The reaction is allowed to proceed at about room temperature under which conditions the reaction is ordinarily complete in about twelve to twenty-four hours. The excess organic sulfonyl chloride and pyridine are neutralized by the addition of a mildly alkaline aqueous solution such as aqueous sodium bicarbonate, and the resulting mixture is agitated for a short period of time, during which time the sulfonate crystallizes. An organic solvent such as benzene is added to the reaction mixture, the mixture is poured into ice water, and the organic layer is separated. The organic layer is washed with water, dried and evaporated in vacuo. The residual material can be purified by recrystallization to give the 16-sulfonate ester of $\Delta^{5,16}$-3-ethylenedioxy-16-hydroxy-11,20-diketo-pregnadiene in substantially pure form.

The catalytic hydrogenation of the latter material is conveniently carried out by dissolving the 16-sulfonate ester of $\Delta^{5,16}$ - 3 - ethylenedioxy-16-hydroxy-11,20-diketopregnadiene in benzene, adding a hydrogenation catalyst, such as palladium on barium carbonate, and contacting the mixture with hydrogen at atmospheric pressure, or preferably at superatmospheric pressure. When the hydrogenation reaction is carried out at room temperature and at a pressure of about forty pounds per square inch, the reaction is substantially complete in about twenty hours. It is ordinarily preferred to add additional amounts of catalysts during the course of the hydrogenation. The hydrogenation mixture is filtered, and the filtered solution is evaporated in vacuo. The residual oil is crystallized to give substantially pure $\Delta^5$-3-ethylenedioxy-11,20-diketo-pregnene.

The latter compound is treated with a hydrolyzing agent, preferably an aqueous mineral acid such as hydrochloric acid, perchloric acid, p-toluene sulfonic acid, and the like, thereby hydrolyzing the ketal substituent in the 3-position of the molecule. When aqueous perchloric acid is employed, the hydrolysis is conveniently carried out by dissolving the $\Delta^5$-3-ethylenedioxy-11,20-diketo-pregnene in an organic solvent such as tetrahydrofuran, adding a dilute aqueous solution of perchloric acid to the resulting solution, and allowing the resulting mixture to stand at about room temperature for a period of about three to four hours. The solvents are evaporated in vacuo, and the residual material is extracted with an organic solvent such as chloroform. The chloroform extract is dried, the chloroform evaporated in vacuo, and the residual material is crystallized to give substantially pure $\Delta^4$-3,11,20-triketo-pregnene.

The stereoisomeric form of $\Delta^4$-3,11,20-triketo-pregnene having a melting point of about 175–176° C. possesses the eteroisomeric configuration characteristic of the naturally-occurring steroid hormones such as progesterone. We refer to this stereoisomer by the name of 11-keto progesterone. This compound is obtained in the form of a racemic mixture of the d- and l-forms, and is referred to more specifically as dl-11-keto-progesterone.

The 3-ethylenedioxy derivation of dl-$\Delta^4$-3,11,20-triketo-pregnene of melting point 175–176° C. obtained as hereinabove described may be converted to the apeutically active material 3,11,20 - triketo - 17$\alpha$-hydroxy-21-acetoxy-$\Delta^4$-pregnene as follows: dl-3-ethylenedioxy-11,20-diketo-$\Delta^5$-pregnene is treated with dimethyl oxalate and then with alkali to form the C–21 oxalyl acid derivative. On formation of the strychnine salts of the components of this racemic mixture the d-salt precipitates and may be recovered by filtration. Decomposition of this strychnine salt and hydrolysis of the C–21 oxalyl acid group yields 3-ethylenedioxy-11,20-diketo-$\Delta^5$-pregnene identical with that obtained from naturally occurring materials.

Iodination under alkaline conditions of the natural isomer of the 21-oxalyl acid of 3-ethylenedioxy-11,20-diketo-$\Delta^5$-pregnene, which may be obtained in the above described resolution procedure, yields 3-ethylenedioxy-11,20-diketo-21-iodo-$\Delta^5$-pregnene. By treatment of this latter compound with potassium acetate there is obtained 3-ethylenedioxy-11,20-diketo-21-acetoxy-$\Delta^5$-pregnene of melting point 193.5–194° C.

Reaction of the last mentioned compound with hydrogen cyanide followed by dehydration of the C-20 cyanhydrin thus formed with phosphorous oxychloride yields 3-ethylenedioxy-11-keto-20-cyano-21-acetoxy-$\Delta^{5,17}$-pregnadiene, which may be oxidized with potassium permanganate to 3-ethylenedioxy-11,20-diketo-17$\alpha$-hydroxy-21-acetoxy-$\Delta^5$-pregnene. 3,11,20-triketo-17$\alpha$-hydroxy-21-acetoxy-$\Delta^4$-pregnene, alternatively known as cortisone acetate, may be prepared by acid hydrolysis of the above mentioned 3-ethylenedioxy-11,20-diketo-17$\alpha$-hydroxy-21-acetoxy-$\Delta^5$-pregnene.

The 3-ethylenedioxy derivative of dl-3,11,20-triketo-$\Delta^4$-pregnene may also be converted into dl-3,11,20-triketo-17$\alpha$-hydroxy-21-acetoxy-$\Delta^4$-pregnene by the procedure hereinabove described.

In addition to being useful as an intermediate in the total synthesis of cortisone acetate, dl-11-keto-progesterone has been shown to possess greater cortisone-like activity (as measured by the granuloma inhibition test) than either d-11-keto-progesterone or cortisone. The fact that dl-11-keto-progesterone possess greater cortisone-activity than d-11-keto-progesterone is particularly unobvious in view of the fact that the corresponding l-isomer is substantially inactive.

The following examples illustrate methods of carrying out the present invention, but it is to be understood that these examples are given for purposes of illustration and not of limitation.

*Example 1*

To a solution of 24 g. of 1-ethoxyethinyl-2-methallyl-2,4b-dimethyl-7-ethylenedioxy-1,2,3,4,4a,4b,5,6,7,8,10,10a-dodecahydrophenanthrene-1-ol-4-one (M. P. 133–134° C.) in 160 ml. of tetrahydrofuran was added 10 ml. of 10% aqueous sulfuric acid. The resulting mixture was maintained at a temperature within the range of 27° C. to 29° C. for a period of about three and one-half hours. At the end of this time, an excess of a saturated aqueous solution of sodium bicarbonate was added to the reaction mixture, and the tetrahydrofuran was evaporated from the aqueous mixture under reduced pressure. The oil which separated was extracted into ether; the ether extract was washed once with water, dried over sodium sulfate, and the ether was evaporated. The residual oily material was dissolved in ether and chromatographed on acid-washed alumina. The adsorbate was eluted with mixtures of ether and petroleum ether; upon evaporation of the 8:2 petroleum ether-ether eluate there was obtained 1-carboethoxymethylene-2-methallyl-2,4b-di-methyl-7-ethylenedioxy-1,2,3,4,4a,4b,5,6,7,8,10,10a-dodecahydrophenanthrene-4-one; upon evaporation of the 7:3 petroleum ether-ether eluate there was obtained 1-carboethoxymethyl-2-methallyl-2,4b-di-methyl-7-ethylenedioxy-1,2,3,4,4a,4b,5,6,7,8,10,10a-dodecahydrophenanthrene-1-ol-4-one having an M. P. of 99–101° C.

In accordance with the foregoing experimental procedure and utilizing as starting material the stereoisomer of 1-ethoxyethinyl-2-methallyl-2,4b-dimethyl-7-ethylenedioxy-1,2,3,4,4a,4b,5,6,7,8,10,10a-dodecahydrophenanthrene-1-ol-4-one having an M. P. of 133–134° C., there was obtained the stereoisomer of 1-carboethoxymethyl-2-metallyl-2,4b-dimethyl-7-ethylendioxy-1,2,3,4,4a,4b,5,6,7,8,10,10a-dodecahydrophenanthrene-1-ol-4-one having an M. P. of 99–101° C. and the stereoisomer of 1-carboethoxymethylene-2-methallyl-2,4b-dimethyl-7-ethylenedioxy-1,2,3,4,4a,4b,5,6,7,8,10,10a-dodecahydrophenanthrene-4-one having an M. P. of 133–134° C. and 151–152° C. (dimorphic).

By using a stereochemical modification of the above 1-ethoxyethinyl-2-methallyl-2,4b-dimethyl-7-ethylenedioxy-1,2,3,4,4a,4b,5,6,7,8,10,10a-dodecahydrophenanthrene-1-ol-4-one starting material having an M. P. of 131–132° C. there was obtained the stereoisomer of 1-carboethoxymethyl-2-methallyl-2,4b-dimethyl-7-ethylenedioxy-1,2,3,4,4a,4b,5,6,7,8,10,10a-dodecahydrophenanthrene-1-ol-4-one having an M. P. of 146° C. and the stereoisomer of 1-carboethoxymethylene-2-methallyl-2,4b-dimethyl-7-ethylenedioxy-1,2,3,4,4a,4b,5,6,7,8,10,10a-dodecahydrophenanthrene-4-one having an M. P. of 94–96°C.

*Example 2*

A suspension of 4.1 g. of 1-carboethoxymethylene-2-methallyl-2,4b-dimethyl-7-ethylenedioxy-1,2,3,4,4a,5,6,7,8,10,10a-dodecahydrophenanthrene-4-one in 50 ml. of methanol and 50 ml. of water containing 10 g. of potassium carbonate and 1 g. of potassium hydroxide was heated to boiling under reflux for a period of two and one-half hours. At the end of this time, all of the ester had dissolved. The methanol was evaporated under reduced pressure, whereupon the potassium salt of 1-carboxymethylene-2-methallyl-2,4b-dimethyl-7-ethylenedioxy-1,2,3,4,4a,4b,5,6,7,8,10,10a-dodecahydrophenanthrene-4-one separated as an oil, and approximately 50 ml. of water was added to dissolve the salt. The aqueous mixture was extracted once with ether, and then acidified with excess sodium dihydrogen phosphate. The acidified mixture was then extracted with chloroform, and the chloroform extract was dried over sodium sulfate, filtered and evaporated to dryness under reduced pressure at a bath temperature which did not exceed about 40° C. The residual crystalline material was washed with ether and recrystallized from ethyl acetate to give substantially pure 1-carboxymethylene-2-methallyl-2,4b-dimethyl-7-ethylenedioxy-1,2,3,4,4a,4b,5,6,7,8,10,10a-dodecahydrophenanthrene-4-one.

In accordance with the foregoing experimental procedure and utilizing as starting material the stereoisomer of 1-carboethoxymethylene-2-methallyl-2,4b-dimethyl-7-ethylenedioxy-1,2,3,4,4a,4b,5,6,7,8,10,10a-dodecahydrophenanthrene-4-one having an M. P. of 133–134° C.; 151.2° C., there was obtained the stereoisomer of 1-carboxymethylene-2-methallyl-2,4b-dimethyl-7-ethylenedioxy-1,2,3,4,4a,4b,5,6,7,8,10,10a-dodecahydrophenanthrene-4-one having an M. P. of 223–225° C.

When the stereoisomer of 1-carboethoxymethylene-2-methallyl-2,4b-dimethyl-7-ethylenedioxy-1,2,3,4,4a,4b,5,6,7,8,10,10a-dodecahydrophenanthrene-4-one having an M. P. of 94–96° C. was used as starting material and the saponification conducted as described in the first paragraph of the present example except that the potassium hydroxide was omitted from the saponification mixture, there was obtained the stereoisomer of 1-carboxymethylene-2-methallyl-2,4b-dimethyl-7-ethylenedioxy-1,2,3,4,4a,4b,5,6,7,8,10,10a-dodecahydrophenanthrene-4-one having an M. P. of 203–205° C.

A solution containing about 50 mg. of 1-carboxymethylene-2-methallyl-2,4b-dimethyl-7-ethylenedioxy-1,2,3,4,4b,5,6,7,8,10,10a-dodecahydrophenanthrene-4-one and about 15 mg of p-toluene sulfonic acid in about 3 ml. of acetone was heated under reflux for a period of approximately twenty minutes. The acetone reaction mixture was diluted with water and the resulting aqueous mixture was extracted with chloroform. The chloroform extract was dried and evaporated to dryness to give 1-carboxymethylene-2-methallyl-2,4b-dimethyl-1,2,3,4,4a,4b,5,6,7,9,10,10a-dodecahydrophenanthrene-4,7-dione.

Example 3

A solution of 100 mg. of 1-carboxymethylene-2-methallyl-2,4b-dimethyl - 7 - ethylenedioxy-1,2,3,4,4a,4b, 5,6,7,8,10,10a-dodecahydrophenanthrene-4-one was suspended in 5 ml. of water. One gram of sodium borohydride was added cautiously until the initial reaction was completed. After all of the reducing agent had dissolved, the mixture was heated at 100° C. for three hours. The reaction mixture was cooled, acidified with sodium dihydrogen phosphate, and the acidified mixture extracted with chloroform. The chloroform extract was washed with water, dried over anhydrous sodium sulfate, and filtered, and the chloroform was evaporated from the filtered solution in vacuo at a bath temperature of less than about 40° C. The residual oil was crystallized from ether, and recrystallized from ethyl acetate to give substantially pure 1-carboxymethylene-2-methallyl-2,4b-dimethyl - 7 - ethylenedioxy - 1,2,3,4,4a,4b,5,6,7,8,10,10a-dodecahydrophenanthrene-4-ol.

In accordance with the foregoing procedure and utilizing as starting material the stereoisomer of 1-carboxymethylene - 2 - methallyl - 2,4b - dimethyl - 7 - ethylenedioxy - 1,2,3,4,4a,4b,5,6,7,8,10,10a - dodecahydrophenanthrene-4-one having an M. P. of 223–225° C. there was obtained the stereoisomer of 1-carboxymethylene-2-methallyl - 2,4b - dimethyl - 7 - ethylenedioxy - 1,2,3,4, 4a,4b,5,6,7,8,10,10a-dodecahydrophenanthrene-4-ol having an M. P. of 211–214° C.

Upon heating, under reflux, a solution of 50 mg. of 1 - carboxymethylene - 2 - methallyl - 2,4b - dimethyl - 7- ethylenedioxy - 1,2,3,4,4a,4b,5,6,7,8,10,10a - dodecahydrophenanthrene-4-ol and 15 mg. of p-toluene sulfonic acid in 3 ml. of acetone for a period of about 20 minutes, there is obtained 1-carboxymethylene-2-methallyl-2,4b-dimethyl - 1,2,3,4,4a,4b,5,6,7,9,10,10a - dodecahydrophenanthrene-4-ol-7-one.

Example 4

A suspension of 5 g. of 1-carboxymethylene-2-methallyl-2,4b - dimethyl - 7 - ethylenedioxy - 1,2,3,4,4a,4b,5,6,7,8, 10,10a-dodecahydrophenanthrene-4-one in 20 ml. of tetrahydrofuran and 200 ml. of liquid ammonia was stirred at a temperature of −40° C. while pea-sized portions of lithium were added at intervals and at a rate sufficient to maintain an excess of the alkali metal. The liquid ammonia reaction mixture was stirred at a temperature of about −40° C. for a total time of about two hours during which the addition of the lithium was continued; a total of about 500 mg. of lithium was used. The excess ammonia was evaporated from the reaction mixture at room temperature, about 200 ml. of benzene was added, and ethyl acetate was then added cautiously to destory the excess lithium. One hundred and fifty milliliters of water was added to the mixture and the benzene layer was discarded. The alkaline aqueous layer was acidified with excess sodium dihydrogen phosphate and the acidified aqueous mixture extracted with chloroform. The chloroform extract was washed with water, dried over anhydrous sodium sulfate, filtered, and the chloroform evaporated from the filtered solution under reduced pressure. The residual oil was covered with 50 ml. of ether and the mixture heated under reflux for about fifteen minutes. The crystalline precipitate which formed was recovered by cooling the ethereal mixture and filtering. This crystalline material was fractionally crystallized from acetonitrile to give 1-carboxymethyl-2-methallyl-2,4b - dimethyl - 7 - ethylenedioxy - 1,2,3,4,4a,4b,5,6,7,8, 10,10a-dodecahydrophenanthrene-4-one, which crystallized first, and 1-carboxymethyl-2-methallyl-2,4b-dimethyl - 7 - ethylenedioxy - 1,2,3,4,4a,4b,5,6,7,8,10,10a-dodecahydrophenanthrene-4-ol (the more soluble compound).

In accordance with the foregoing experimental procedure and utilizing as starting material the stereoisomer of 1 - carboxymethylene - 2 - methallyl - 2,4b - dimethyl - 7- ethylenedioxy - 1,2,3,4,4a,4b,5,6,7,8,10,10a - dodecahydrophenanthrene-4-one having an M. P. of 223–225° C., there were obtained the stereoisomer of 1-carboxymethyl-2 - methallyl - 2,4b - dimethyl - 7 - ethylenedioxy - 1,2,3, 4,4a,4b,5,6,7,8,10,10a - dodecahydrophenanthrene-4-one having an M. P. of 201–203° C., and two stereoisomers of 1-carboxymethyl-2-methallyl-2,4b-dimethyl-7-ethylenedioxy - 1,2,3,4,4a,4b,5,6,7,8,10,10a-dodecahydrophenanthrene-4-ol, one of which has an M. P. of 226–228° C. and the other an M. P. of 234–235° C.

When the stereoisomer of 1-carboxymethylene-2-methallyl - 2,4b - dimethyl - 7 - ethylenedioxy - 1,2,3,4,4a,4b, 5,6,7,8,10,10a-dodecahydrophenanthrene-4-one having an M. P. of 203–205° C. was used as starting material there were obtained two stereoisomers of 1-carboxymethyl-2-methallyl - 2,4b - dimethyl-7-ethylenedioxy-1,2,3,4,4a,4b, 5,6,7,8,10,10a - dodecahydrophenanthrene - 4 - ol one of which has an M. P. of 255–257° C. and the other an M. P. of 216–220° C.

When 1-carboxymethylene-2-methallyl-2,4b-dimethyl-7-ethylenedioxy - 1,2,3,4,4a,4b,5,6,7,8,10,10a-dodecahydrophenanthrene-4-ol was utilized as starting material in the foregoing procedure, the product obtained was 1-carboxymethyl - 2 - methallyl - 2,4b - dimethyl - 7 - ethylenedioxy-1,2,3,4,4a,4b,5,6,7,8,10,10a - dodecahydrophenanthrene-4-ol.

A solution containing about 50 mg. of 1-carboxymethyl - 2 - methallyl - 2,4b - dimethyl - 7 - ethylenedioxy-1,2,3,4,4a,4b,5,6,7,8,10,10a - dodecahydrophenanthrene-4-ol and about 15 mg. of p-toluene sulfonic acid in about 3 ml. of acetone was heated under reflux for a period of about twenty minutes. The acetone reaction mixture was diluted with water and the resulting aqueous mixture extracted with chloroform. The chloroform extract was dried and evaporated to dryness to give 1-carboxymethyl-2 - methallyl - 2,4b - dimethyl - 1,2,3,4,4a,4b,5,6,7,9,10, 10a - dodecahydrophenanthrene - 4-ol-7-one. When the stereoisomer of 1 - carboxymethyl - 2-methallyl-2,4b-dimethyl - 7 - ethylenedioxy - 1,2,3,4,4a,4b,5,6,7,8,10,10a-dodecahydrophenanthrene-4-ol having an M. P. of 255–257° C. was hydrolyzed in accordance with the foregoing procedure there was obtained the stereoisomer of 1-carboxymethyl - 2 - methallyl - 2,4b - dimethyl - 1,2,3,4,4a, 4b,5,6,7,9,10,10a - dodecahydrophenanthrene - 4 - ol - 7-one having an M. P. of 215–217° C.; when the stereoisomer of 1-carboxymethyl-2-methallyl-2,4b-dimethyl-7 - ethylenedioxy - 1,2,3,4,4a,4b,5,6,7,8,10,10a - dodecahydrophenanthrene-4-ol having an M. P. of 216–220° C. was similarly hydrolyzed there was obtained the stereoisomer of 1-carboxymethyl-2-methallyl-2,4b-dimethyl-1,2,3,4,4a,4b,5,6,7,8,10,10a - dodecahydrophenanthrene-4-ol-7-one having an M. P. of 190–192° C.

When 1 - carboxymethyl - 2-methallyl-2,4b-dimethyl-7-ethylenedioxy - 1,2,3,4,4a,4b,5,6,7,8,10,10a - dodecahydrophenanthrene-4-one is similarly hydrolyzed using an acetone solution of p-toluene sulfonic acid, there is obtained 1-carboxymethyl-2-methallyl-2,4b-dimethyl-1,2,3,4, 4a,4b,5,6,7,9,10,10a - dodecahydrophenanthrene - 4,7-dione.

Example 5

One and two-tenths gram of sodium metal was added to 20 ml. of refluxing ethyl alcohol, followed immediately by one-half gram of 1-carboxymethylene-2-methallyl-2,4b - dimethyl - 7 - ethylenedioxy - 1,2,3,4,4a,4b,5,6,7,8, 10,10a-dodecahydrophenanthrene-4-one. The resulting mixture was stirred vigorously for a period of about fifteen minutes. The reaction mixture was evaporated to one-half volume in vacuo, and the concentrated solution was diluted with water. The aqueous solution was extracted with chloroform, and this extract, after being dried, was evaporated to dryness in vacuo. The residual crystalline material was fractionally crystallized from acetonitrile to give substantially pure 1-carboxymethyl-2- methallyl - 2,4b - dimethyl - 7 - ethylenedioxy - 1,2,3,4,4a,4b,5,6,7,8,10,10a-dodecahydrophenanthrene-4-ol.

In accordance with the foregoing experimental procedure and utilizing as starting material the stereoisomer of 1 - carboxymethylene - 2 - methallyl - 2,4b - dimethyl - 7 - ethylenedioxy - 1,2,3,4,4a,4b,5,6,7,8,10,10a - dodecahydrophenanthrene-4-one having an M. P. of 203–205° C., there was obtained the stereoisomer of 1-carboxymethyl-2 - methallyl - 2,4b - dimethyl - 7 - ethylenedioxy - 1,2,3,4,4a,4b,5,6,7,8,10,10a-dodecahydrophenanthrene-4-ol having an M. P. of 255–257° C.

Example 6

One part of 1-carboxymethylene-2-methallyl-2,4b-dimethyl - 7 - ethylenedioxy - 1,2,3,4,4a,4b,5,6,7,8,10,10a-dodecahydrophenanthrene-4-one (M. P. 203–205° C.) was reacted with about 2.4 parts of sodium metal utilizing the same procedure as that described in Example 5 hereinabove except that n-butanol was used for the reduction medium in place of ethyl alcohol. The reaction mixture was worked up as in Example 5 to give substantially pure 1-carboxymethyl-2-methallyl-2,4b-dimethyl-7-ethylenedioxy - 1,2,3,4,4a,4b,5,6,7,8,10,10a-dodecahydrophenanthrene-4-ol (M. P. 255–257° C.).

Example 7

A mixture of one part of 1-carboxymethylene-2-methallyl-2,4b-dimethyl-7-ethylenedioxy - 1,2,3,4,4a,4b,5,6,7,8,10,10a-dodecahydrophenanthrene-4-one (M. P. 203–205° C.), about 4 parts of potassium metal, and about 40 ml. of n-butanol was stirred at the reflux temperature of the solvent for a period of about fifteen minutes. The reaction mixture was worked up as in Example 5 hereinabove to give substantially pure 1-carboxymethyl-2-methallyl-2,4b - dimethyl-7-ethylenedioxy - 1,2,3,4,4a,4b,5,6,7,8,10,10a-dodecahydrophenanthrene-4-ol (M. P. 255–257° C.).

Example 8

A solution of 2.75 g. of 1-carboxymethyl-2-methallyl-2,4b-dimethyl - 7 - ethylendioxy-1,2,3,4,4a,4b,5,6,7,8,10,10a-dodecahydrophenanthrene-4-ol was treated with an excess of diazomethane in ether. After standing overnight at room temperature, the solvents were removed by evaporation. The residual oil was crystallized from ether, and the crystalline material thus obtained recrystallized from a mixture of ethyl acetate, ether, and petroleum ether to give substantially pure 1-carbomethoxymethyl-2-methallyl-2,4b-dimethyl - 7 - ethylenedioxy-1,2,3,4,4a,4b,5,6,7,8,10,10a-dodecahydrophenanthrene-4-ol.

In accordance with the foregoing experimental procedure and utilizing as starting material the stereoisomer of 1-carboxymethyl - 2 - methallyl - 2,4b-dimethyl-7-ethylenedioxy - 1,2,3,4,4a,4b,5,6,7,8,10,10a - dodecahydrophenanthrene-4-ol having an M. P. of 226–228° C., there was obtained the stereoisomer of carbomethoxymethyl-2-methallyl-2,4b-dimethyl - 7 - ethylenedioxy-1,2,3,4,4a,4b,5,6,7,8,10,10a-dodecahydrophenanthrene-4-ol having an M. P. of 138–139° C.

When the stereoisomer of 1-carboxymethyl-2-methallyl-2,4b - dimethyl - 7 - ethylenedioxy - 1,2,3,4,4a,4b,5,6,7,8,10,10a-dodecahydrophenanthrene-4-ol having an M. P. of 255–257° C. was used as starting material there was obtained the stereoisomer of 1-carbomethoxymethyl-2-methallyl-2,4b-dimethyl-7-ethylenedioxy - 1,2,3,4,4a,4b,5,6,7,8,10,10a-dodecahydrophenanthrene-4-ol having an M. P. of 157–158° C.

When the stereoisomer of 1-carboxymethyl-2-methallyl-2,4b-dimethyl-7-ethylenedioxy - 1,2,3,4,4a,4b,5,6,7,8,10,10a-dodecahydrophenanthrene-4-ol having an M. P. of 216–220° C. was used as starting material there was obtained the stereoisomer of 1-carbomethoxymethyl-2-methallyl-2,4b-dimethyl-7-ethylenedioxy - 1,2,3,4,4a,4b,5,6,7,8,10,10a - dodecahydrophenanthrene-4-ol having an M. P. of 83–85° C.

A solution containing about 50 mg. of 1-carbomethoxymethyl-2-methallyl-2,4b-dimethyl - 7 - ethylenedioxy-1,2,3,4,4a,4b,5,6,7,8,10,10a - dodecahydrophenanthrene-4-ol and about 15 mg. of p-toluene sulfonic acid in about 3 ml. of acetone was heated under reflux for a period of about twenty minutes. The acetone reaction mixture was diluted with water and the resulting aqueous mixture extracted with chloroform. The chloroform extract was dried and evaporated to dryness to give 1-carbomethoxymethyl-2-methallyl - 2,4b - dimethyl-1,2,3,4,4a,4b,5,6,7,9,10,10a - dodecahydrophenanthrene-4-ol-7-one. When the stereoisomer of 1-carbomethoxymethyl-2-methallyl-2,4b-dimethyl-7-ethylenedioxy - 1,2,3,4,4a,4b,5,6,7,8,10,10a-dodecahydrophenanthrene-4-ol having an M. P. of 137–138° C. was used as starting material, there was obtained the stereoisomer of 1-carbomethoxymethyl-2-methallyl-2,4b-dimethyl - 1,2,3,4,4a,4b,5,6,7,9,10,10a-dodecahydrophenanthrene-4-ol-7-one having an M. P. of 133–134° C.

Example 9

A suspension of 4.15 g. of 1-carboxymethyl-2-methallyl-2,4b - dimethyl-7-ethylenedioxy - 1,2,3,4,4a,4b,5,6,7,8,10,10a-dodecahydrophenanthrene-4-ol and 8 g. of anhydrous potassium carbonate in 50 ml. of dry acetone containing 8 ml. of methyl iodide was stirred, in a loosely-stoppered flask, at room temperature for a period of about fifteen hours. The reaction solution was filtered thereby removing the precipitated potassium iodide and excess potassium carbonate. The acetone was evaporated from the filtered solution in vacuo, and the residual oil was dissolved in ether; the ethereal solution was washed twice with 10 ml.-portions of water, dried over anhydrous sodium sulfate, and the solvents evaporated. The residual oil was crystallized from ether and dried to give substantially pure 1-carbomethoxymethyl - 2 - methallyl-2,4b-dimethyl-7-ethylenedioxy - 1,2,3,4,4a,4b,5,6,7,8,10,10a-dodecahydrophenanthrene-4-ol.

In accordance with the foregoing experimental procedure and utilizing the stereoisomer of 1-carboxymethyl-2-methallyl-2,4b-dimethyl-7-ethylenedioxy-1,2,3,4,4a,4b,5,6,7,8,10,10a-dodecahydrophenanthrene-4-ol having an M. P. of 216–220° C. as starting material, there was obtained the stereoisomer of 1-carbomethoxymethyl-2-methallyl-2,4b - dimethyl-7-ethylenedioxy - 1,2,3,4,4a,4b,5,6,7,8,10,10a-dodecahydrophenanthrene-4-ol having an M. P. of 83–85° C.

Example 10

A solution of 350 mg. of 1-carbomethoxymethyl-2-methallyl-2,4b-dimethyl - 7 - ethylenedioxy-1,2,3,4,4a,4b,5,6,7,8,10,10a-dodecahydrophenanthrene-4-ol in 3.5 ml. of pyridine was added to the complex formed by adding 350 mg. of chromium trioxide to 3.5 ml. of pyridine. The resulting mixture was shaken, and allowed to stand at room temperature in a closed vessel for a period of about fifteen hours. The reaction mixture was diluted with about 30 ml. of water, and the aqueous solution was extracted with three 50 ml.-portions of ether. The ethereal extracts were combined, washed twice with water, dried over anhydrous sodium sulfate, and the solvent evaporated. The residual oil was crystallized twice from ether to give substantially pure 1-carbomethoxymethyl-2-methallyl-2,4b-dimethyl-7-ethylenedioxy - 1,2,3,4,4a,4b,5,6,7,8,10,10a-dodecahydrophenanthrene-4-one.

In accordance with the foregoing experimental procedure and utilizing as starting material the stereoisomer of 1-carbomethoxymethyl-2-methallyl-2,4b - dimethyl - 7-ethylenedioxy-1,2,3,4,4a,4b,5,6,7,8,10,10a - dodecahydrophenanthrene-4-ol having an M. P. of 138–139° C., there was obtained the stereoisomer of 1-carbomethoxymethyl-2-methyllyl-2,4b-dimethyl-7-ethylenedioxy - 1,2,3,4,4a,4b,5,6,7,8,10,10a-dodecahydrophenanthrene-4-one having an M. P. of 125–127° C.; when the stereoisomer of 1-carbomethoxymethyl-2-methallyl - 2,4b - dimethyl-7-ethylenedioxy-1,2,3,4,4a,4b,5,6,7,8,10,10a - dodecahydrophenanthrene-4-ol having an M. P. of 157–158° C. was used as starting material there was obtained the stereoisomer of 1-carbomethoxymethyl-2-methallyl - 2,4b - dimethyl-7-ethylenedioxy-1,2,3,4,4a,4b,5,6,7,8,10,10a - dodecahydrophenanthrene-4-one having an M. P. of 140–141° C.; when the stereoisomer of 1-carbomethoxymethyl-2-methallyl-2,4b-dimethyl-7-ethylenedioxy - 1,2,3,4,4a,4b,5,6,7,8,10,10a-dodecahydrophenanthrene-4-ol having an M. P. of 83–85° C. was used as starting material there was obtained the stereoisomer of 1-carbomethoxymethyl-2-methallyl-2,4b-dimethyl-7-ethylenedioxy - 1,2,3,4,4a,4b,5,6,7,8,10,10a-dodecahydrophenanthrene-4-one having an M. P. of 142–146° C.

When the stereoisomer of 1-carboxymethyl-2-methallyl-2,4b-dimethyl-7-ethylenedioxy - 1,2,3,4,4a,4b,5,6,7,8,10,10a-dodecahydrophenanthrene-4-ol having an M. P. of 234–235° C. was reacted with diazomethane in ether in accordance with the procedure described in Example 8 hereinabove, and the resulting stereoisomer of 1-carbomethoxymethyl-2-methallyl-2,4b-dimethyl - 7 - ethylenedioxy-1,2,3,4,4a,4b,5,6,7,8,10,10a - dodecahydrophenanthrene-4-ol reacted with chromium trioxide-pyridine complex in accordance with the procedure described in the present example there was obtained the stereoisomer of 1-carbomethoxymethyl-2-methallyl - 2,4b - dimethyl-7-ethylenedioxy-1,2,3,4,4a-4b,5,6,7,8,10,10a - dodecahydrophenanthrene-4-one having an M. P. of 155° C.

Upon heating together, under reflux, 1-carbomethoxymethyl-2-methallyl-2,4b-dimethyl-7-ethylenedioxy - 1,2,3,4,4a,4b,5,6,7,8,10,10a - dodecahydrophenanthrene-4-one and an acetone solution of p-toluene sulfonic acid, whereby the ethylenedioxy substituent is hydrolyzed without appreciably affecting the carbomethoxy ester grouping, there is obtained 1-carbomethoxy-methyl-1,2,3,4,4a,4b,5,6,7,9,10,10a-dodecahydrophenanthrene-4,7-dione.

*Example 11*

To a solution of 378 mg. of 1-carbomethoxymethyl-2-methallyl-2,4b-dimethyl-7-ethylenedioxy - 1,2,3,4,4a,4b,5,6,7,8,10,10a-dodecahydrophenanthrene-4-one in 3 ml. of dry ether and 0.5 ml. of dry benzene was added 254 mg. of osmium tetroxide. The resulting solution began to deposit in a few minutes a brown-black precipitate which can be recovered by filtration and dried to give the osmate ester of 1-carbomethoxymethyl-2-(beta, gamma-dihydroxyisobutyl)-2,4b-dimethyl - 7 - ethylenedioxy - 1,2,3,4,4a,4b,5,6,7,8,10,10a-dodecahydrophenanthrene-4-one. Instead of isolating the osmate ester, the reaction mixture was allowed to stand at room temperature for a period of one hour, and 18 ml. of ethanol was then added to the reaction mixture. A solution of 0.8 g. of anhydrous sodium sulfite in 9 ml. of water was added to the alcoholic reaction mixture, the resulting mixture was vigorously agitated for a period of about three minutes, and the precipitated osmium oxide removed by filtration. The filtered reaction solution was cautiously acidified with dilute acetic acid to a pH of about 6, and the mildly acid aqueous solution was evaporated under reduced pressure to an oil. Water was added to the oil, and the aqueous mixture was extracted with ether. The ether extract was washed with water, dried over anhydrous sodium sulfate, and the ether evaporated. The residual crystalline material was crystallized from ethyl acetate to give 1-carbomethoxymethyl-2-(beta,gamma-dihydroxyisobutyl) - 2,4b-di-methyl-7-ethylenedioxy - 1,2,3,4,4a,4b,5,6,7,8,10,10a-dodecahydrophenanthrene-4-one.

In accordance with the foregoing experimental procedure and utilizing as starting material the stereoisomer of 1-carbomethoxymethyl-2-methallyl - 2,4b - dimethyl-7-ethylenedioxy-1,2,3,4,4a,4b,5,6,7,8,10,10a - dodecahydrophenanthrene-4-one having an M. P. of 125–127° C., there was obtained the stereoisomer of 1-carbomethoxymethyl-2-(beta,gamma-dihydroxyisobutyl) - 2,4b - dimethyl-7-ethylenedioxy - 1,2,3,4,4a,4b,5,6,7,8,10,10a-dodecahydrophenanthrene-4-one having an M. P. of 172–174° C.; when the stereoisomer of 1-carbomethoxymethyl-2-methallyl-2,4b-dimethyl-7-ethylenedioxy - 1,2,3,4,4a,4b,5,6,7,8,10,10a-dodecahydrophenanthrene-4-one having an M. P. of 140–141° C. was used as starting material, there was obtained the stereoisomer of 1-carbomethoxymethyl-2-(beta,gamma-dihydroxyisobutyl) - 2,4b - dimethyl-7-ethylenedioxy-1,2,3,4,4a,4b,5,6,7,8,10,10a - dodecahydrophenanthrene-4-one having an M. P. of 142–155° C.; when the stereoisomer of 1-carbomethoxymethyl-2-methallyl-2,4b-dimethyl-7-ethylenedioxy - 1,2,3,4,4a,4b,5,6,7,8,10,10a-dodecahydrophenanthrene-4-one having an M. P. of 142–146° C. was used as starting material, there was obtained the stereoisomer of 1-carbomethoxymethyl-2-(beta,gamma-dihydroxyisobutyl) - 2,4b-dimethyl-7-ethylenedioxy - 1,2,3,4,4a,4b,5,6,7,8,10,10a - dodecahydrophenanthrene-4-one having an M. P. of 143–147° C.

Upon heating together, under reflux, 1-carbomethoxymethyl-2-(beta,gamma-dihydroxyisobutyl - 2,4b - dimethyl-7-ethylenedioxy-1,2,3,4,4a,4b,5,6,7,8,10,10a - dodecahydrophenanthrene-4-one and an acetone solution of p-toluene sulfonic acid, whereby the ethylenedioxy substituent is hydrolyzed without appreciably affecting the carbomethoxy ester grouping, there is obtained 1-carbomethoxymethyl-2-(beta,gamma-dihydroxyisobutyl) - 2,4b-dimethyl-1,2,3,4,4a,4b,5,6,7,9,10,10a - dodecahydrophenanthrene-4,7-dione.

*Example 12*

To a solution of 400 mg. of 1-carbomethoxymethyl-2-(beta,gamma-dihydroxyisobutyl - 2,4b-dimethyl-7-ethylenedioxy-1,2,3,4,4a,4b,5,6,7,8,10,10a - dodecahydrophenanthrene-4-one in 4 ml. of ethanol was added 1 ml. of pyridine and a solution of 350 mg. of periodic acid in 2 ml. of water. The resulting mixture was allowed to stand for a period of about six minutes at the end of which time the exothermic reaction which occurred was substantially complete. The reaction mixture was diluted with 20 ml. of water, and the aqueous mixture extracted with ether. The ether extract was washed with 5 ml. of water, dried over sodium sulfate, filtered and the ether evaporated. The residual oil was crystallized from petroleum ether to give substantially pure 1-carbomethoxymethyl-2-acetonyl-2,4b-dimethyl-7-ethylenedioxy - 1,2,3,4,4a,4b,5,6,7,8,10,10a-dodecahydrophenanthrene-4-one.

In accordance with the foregoing experimental procedure and utilizing as starting material the stereoisomer of 1 - carbomethoxymethyl-2-(beta,gamma-dihydroxyisobutyl) - 2,4b - dimethyl-7-ethylenedioxy-1,2,3,4,4a,5,6,7,8,10,10a-dodecahydrophenanthrene-4-one having an M. P. of 172–174° C. there was obtained the stereoisomer of 1 - carbomethoxymethyl - 2 - acetonyl - 2,4b - dimethyl-7 - ethylenedioxy - 1,2,3,4,4a,4b,5,6,7,8,10,10a-dodecahydrophenanthrene - 4 - one which crystallized from ether in a crystal form having an M. P. of 108–109° C. and which crystallized from ethyl acetate-petroleum ether in a crystal form having an M. P. of 85–95° C.; when the stereoisomer of 1-carbomethoxymethyl-2-(beta,gamma - dihydroxyisobutyl) - 2,4b - dimethyl - 7 - ethylenedioxy - 1,2,3,4,4a,4b,5,6,7,8,10,10a - dodecahydrophenanthrene - 4 - one having an M. P. of 142–155° C. was used as starting material there was obtained the stereoisomer of 1 - carbomethoxymethyl - 2 - acetonyl-2,4b - dimethyl -7 - ethylenedioxy - 1,2,3,4,4a,4b,5,6,7,8,10,10a - dodecahydrophenanthrene - 4 - one having an M. P. of 132–134° C.; when the stereoisomer of 1-carboxymethoxymethyl - 2 - (beta,gamma - dihydroxyisobutyl) - 2,4b - dimethyl - 7 - ethylenedioxy - 1,2,3,4,4a,4b,5,6,7,8,10,10a - dodecahydrophenanthrene - 4 - one having an M. P. of 143–147° C. was used as starting material, there was obtained the stereoisomer of 1-carbomethoxymethyl - 2 - acetonyl - 2,4b - dimethyl - 7-ethylenedioxy - 1,2,3,4,4a,4b,5,6,7,8,10,10a - dodecahydrophenanthrene - 4 - one having an M. P. of 144° C.

Upon heating together, under reflux, 1-carbomethoxymethyl - 2 - acetonyl - 2,4b - dimethyl - 7 - ethylenedioxy-1,2,3,4,4a,4b,5,6,7,8,10,10a - dodecahydrophenanthrene-4-one and an acetone solution of p-toluene sulfonic acid, there is obtained 1-carbomethoxymethyl-2-acetonyl-2,4b- dimethyl - 1,2,3,4,4a,4b,5,6,7,8,10,10a - dodecahydrophenanthrene-4,7-dione.

Example 13

One gram of 1-carbomethoxymethyl-2-methallyl-2,4b-dimethyl - 7 - ethylenedioxy - 1,2,3,4,4a,4b,5,6,7,8,10,10a-dodecahydrophenanthrene - 4 - one was dissolved in 100 ml. of methanol. The resulting solution was cooled to a temperature of about −80° C. and a stream of ozonized oxygen containing one equivalent of ozone was passed, over a two-minute period, through the cold solution. The reaction mixture was warmed to a temperature of about 0° C., and 10 ml. of water was added to the mixture followed by five grams of zinc and 5 ml. of acetic acid. The resulting mixture was stirred for a period of about thirty minutes. Water and solid sodium carbonate were then added, the mixture was filtered, and the solvents were evaporated from the filtered solution in vacuo while maintaining the temperature of the solution below about 20° C. The residual material was extracted with ether and ether solution chromatographed on acid-washed alumina. Upon evaporation of the ether-petroleum ether eluate there was obtained 1 - carbomethoxymethyl - 2 - acetonyl-2,4b - dimethyl - 7 - ethylenedioxy - 1,2,3,4,4a,4b,5,6,7,8,10,10a - dodecahydrophenanthrene - 4 - one.

In accordance with the foregoing experimental procedure and utilizing as starting material the stereoisomer of 1 - carbomethoxymethyl - 2 - methallyl - 2,4b - dimethyl - 7 - ethylenedioxy - 1,2,3,4,4a,4b,5,6,7,8,10,10a-dodecahydrophenanthrene - 4 - one having an M. P. of 125–127° C., there was obtained the stereoisomer of 1 - carbomethoxymethyl - 2 - acetonyl - 2,4b - dimethyl-7 - ethylenedioxy - 1,2,3,4,4a,4b,5,6,7,8,10,10a - dodecahydrophenanthrene-4-one having an M. P. of 108–109° C. when crystallized from ether.

Example 14

A solution of 506 mg. of 1-carbomethoxymethyl-2-acetonyl - 2,4b - dimethyl - 7 - ethylenedioxy - 1,2,3,4,4a,4b,5,6,7,8,10,10a - dodecahydrophenanthrene - 4 - one in benzene was distilled at room temperature until the volume of the solution was about 10 ml. This procedure assured a dry solution. This dry solution was added to solid sodium methoxide. (The solid sodium methoxide was prepared by removing the excess methanol from 2.4 ml. of a 1 molar methanol solution of sodium methoxide by baking at 150° C. for thirty minutes in vacuo.) The mixture of the benzene solution of the hydrophenanthrene compound and the solid sodium methoxide was allowed to stand at room temperature for a period of about twenty minutes, at the end of which time a flocculent solid precipitated from the benzene solution. The resulting mixture was stirred at room temperature for a period of about fifteen hours. A mixture of cold water (0° C.) and ether was added to the reaction product and the resulting mixture was vigorously agitated. The aqueous phase was quickly separated and immediately acidified with an excess of an aqueous solution of sodium dihydrogen phosphate. The acidified aqueous solution was extracted with chloroform, and the organic extract was dried over anhydrous sodium sulfate, filtered, and the chloroform evaporated. The residual crystalline material was recrystallized from ethyl acetate-ether, and from ethanol, to give $\Delta^5$-3-ethylenedioxy-11,16,20-triketopregnene.

In accordance with the foregoing experimental procedure and utilizing as starting material the stereoisomer of 1 - carbomethoxymethyl - 2 - acetonyl - 2,4b - dimethyl - 7 - ethylenedioxy - 1,2,3,4,4a,4b,5,6,7,8,10,10a-dodecahydrophenanthrene - 4 - one having an M. P. of 132–134° C., there was obtained the stereoisomer of $\Delta^5$-3-ethylenedioxy-11,16,20-triketo-pregnene having an M. P. of 154–156° C.; when the stereoisomer of 1-carbomethoxymethyl - 2 - acetonyl - 2,4b - dimethyl - 7-ethylenedioxy - 1,2,3,4,4a,4b,5,6,7,8,10,10a - dodecahydrophenanthrene-4-one having, when crystallized from ether, an M. P. of 108–109° C., there was obtained the the stereoisomer of $\Delta^5$ - 3 - ethylenedioxy - 11,16,20-triketo-pregnene having an M. P. of 226–229° C.; when the stereoisomer of 1-carbomethoxymethyl-2-acetonyl-2,4b - dimethyl - 7 - ethylenedioxy - 1,2,3,4,4a,4b,5,6,7,8,10,10a - dodecahydrophenanthrene - 4 - one, having an M. P. of 144° C. was used as starting material, there was obtained the stereoisomer of $\Delta^5$-3-ethylenedioxy-11,16,20-triketo-pregnene having an M. P. of 213–215° C.

Upon heating together, under reflux, $\Delta^5$-3-ethylenedioxy-11,16,20-triketo-pregnene and an acetone solution of p-toluene sulfonic acid (substantially in accordance with the procedure described in Example 1 hereinabove), there was obtained $\Delta^4$-3,11,16,20-tetraketo-pregnene; when the stereoisomer of $\Delta^5$-3-ethylenedioxy-11,16,20-triketo-pregnene having an M. P. of 154–156° C. is used as starting material in this procedure, there was obtained the stereoisomer of $\Delta^4$ - 3,11,16,20 - tetraketo - pregnene having an M. P. of 187–189° C.

Example 15

To a solution of 295 mg. of $\Delta^5$-3-ethylenedioxy-11,16,20-triketo-pregnene in 3.7 ml. of pyridine was added 370 mg. of p-toluenesulfonyl chloride. The resulting mixture was allowed to stand at room temperature for about twenty-two hours. At the end of this period 2.3 ml. of saturated aqueous sodium bicarbonate solution were added to the cooled reaction mixture, thereby neutralizing the pyridine hydrochloride formed by the reaction as well as the excess p-toluenesulfonyl chloride. The aqueous pyridine mixture was agitated at room temperature for a period of about fifteen minutes during which time a crystalline product precipitated. Benzene was added to the reaction mixture, the mixture was poured onto ice, and dilute aqueous hydrochloric acid was added until the mixture was just acid. The organic layer was rapidly separated, washed with water, and with aqueous sodium bicarbonate solution. The washed organic layer was dried over sodium sulfate, and evaporated to dryness in vacuo. The residual material was recrystallized from benzene-petroleum ether-ether and then chromatographed on acid-washed alumina. The material obtained from the 1:1 petroleum ether-ether eluate was recrystallized from benzene-ether to give substantially pure $\Delta^{5,16}$-3-ethylenedioxy-16-p-toluenesulfonoxy-11,20-diketopregnadiene.

In accordance with the foregoing experimental procedure and utilizing as starting material the stereoisomer of $\Delta^5$-3-ethylenedioxy-11,16,20-triketo-pregnene having an M. P. of 154–156° C., there was obtained the stereoisomer of $\Delta^{5,16}$-3-ethylenedioxy-16-p-toluenesulfonoxy-11,20-diketo-pregnadiene having an M. P. of 199–201° C.; when the stereoisomer of $\Delta^5$-3-ethylenedioxy-11,16,20-triketo-pregnene having an M. P. of 226–229° C. was used as starting material, there was obtained the stereoisomer of $\Delta^{5,16}$-3-ethylenedioxy-16-p-toluenesulfonoxy-11,20-diketo-pregnadiene having an M. P. of 189–190° C.; when the stereoisomer of $\Delta^5$-3-ethylenedioxy-11,16,20-triketo-pregnene having an M. P. of 213–215° C. was used as starting material, there was obtained the stereoisomer of $\Delta^{5,16}$-3-ethylenedioxy-16-p-toluenesulfonoxy-11,20-diketo-pregnadiene having an M. P. of 198–200° C.

Upon heating together, under reflux, $\Delta^{5,16}$-3-ethylenedioxy-16-p-toluenesulfonoxy-11,20 - diketo - pregnadiene and an acetone solution of p-toluene sulfonic acid, there is obtained $\Delta^{4,16}$-16-p-toluenesulfonoxy-3,11,20-triketo-pregnadiene.

Example 16

To a solution of 52 mg. of $\Delta^{5,16}$-3-ethylenedioxy-16-p-toluenesulfonoxy-11,20-diketo-pregnadiene in 10 ml. of benzene was added 2 g. of palladium catalyst (5% Pd on $BaCO_3$) and the mixture was shaken at room temperature in contact with hydrogen under a pressure of about forty pounds per square inch. After about two hours, an additional 0.8 g. of catalyst was added and, after four more hours, another 0.8 g. of catalyst was added to the hydrogenation mixture. The resulting mixture was shaken for an additional fifteen hour period at room temperature in contact with hydrogen at a pressure of forty pounds per square inch. The reaction mixture was filtered thereby removing the catalyst and the benzene was evaporated from the filtered solution in vacuo. The residual material was treated with ether and the crystalline product thus obtained was recrystallized from ether-petroleum ether-ether to give substantially pure $\Delta^5$-3-ethylenedioxy-11,20-diketo-pregnene.

In accordance with the foregoing experimental procedure and utilizing as starting material the stereoisomer of $\Delta^{5,16}$-3-ethylenedioxy-16-p-toluenesulfonoxy-11,20-diketo-pregnadiene having an M. P. of 199–201° C. (which was prepared using the stereoisomer of $\Delta^5$-3-ethylenedioxy-11,16,20-triketo-pregnene of M. P. 154–156° C.) there was obtained the stereoisomer of $\Delta^5$-3-ethylenedioxy-11,20-diketo-pregnene having an M. P. of 181–182.5° C.; when the stereoisomer of $\Delta^{5,16}$-3-ethylenedioxy-16-p-toluenesulfonoxy-11,20-diketo-pregnadiene having an M. P. of 189–190° C. was used as starting material, there was obtained the stereoisomer of $\Delta^5$-3-ethylenedioxy-11,20-diketo-pregnene having an M. P. of 142–145° C.; when the stereoisomer of $\Delta^{5,16}$-3-ethylenedioxy-16-p-toluenesulfonoxy-11,20-diketo-pregnadiene having an M. P. of 198–200° C. (prepared, in turn, from the stereoisomer of $\Delta^5$-3-ethylenedioxy-11,16,20-triketo-pregnene of M. P. 213–215° C.) there was obtained the stereoisomer of $\Delta^5$-3-ethylenedioxy-11,20-pregnene, having an M. P. of 171–172° C.

Each of the three stereoisomers of $\Delta^5$-3-ethylenedioxy-11,20-diketo-pregnene, when prepared as described in the present example, are obtained in the form of racemates; i. e. dl-$\Delta^5$-3-ethylenedioxy-11,20-diketo-pregnene of M. P. 181–182.5° C.; dl-$\Delta^5$-3-ethylenedioxy-11,20-diketo-pregnene of M. P. 142–145° C.; and dl-$\Delta^5$-3-ethylenedioxy-11,20-diketo-pregnene of M. P. 171–172° C.

*Example 17*

To a solution of 20 mg. of $\Delta^5$-3-ethylenedioxy-11,20-diketo-pregnene in 1 ml. of tetrahydrofuran was added 0.5 ml. of 3 N aqueous perchloric acid solution. The reaction mixture was allowed to stand at room temperature for a period of approximately three and one-half hours. The solvents were evaporated from the reaction mixture in vacuo, and the residual material was extracted with chloroform. The chloroform extract was dried over sodium sulfate, and the solvent evaporated from the dry chloroform extract in vacuo. The residual material was recrystallized from ether to give $\Delta^4$-3,11,20-triketo-pregnene.

In accordance with the foregoing experimental procedure and utilizing the racemate of $\Delta^5$-3-ethylenedioxy-11,20-diketo-pregnene having an M. P. of 181–182.5° C. as starting material, there was obtained the racemate of $\Delta^4$-3,11,20-diketo-pregnene having an M. P. of 175.5–176.5° C.; when the racemate of $\Delta^5$-3-ethylenedioxy-11,20-diketo-pregnene having an M. P. of 142–145° C. was used as starting material, there was obtained the racemate of $\Delta^4$-3,11,20-triketo-pregnene having an M. P. of 153–158° C.; when the racemate of $\Delta^5$-3-ethylenedioxy-11,20-diketo-pregnene having an M. P. of 171–172° C. was used as starting material, there was obtained the racemate of $\Delta^4$-3,11,20-triketo-pregnene having an M. P. of 153° C. and 168° C. (dimorphic).

The racemate of $\Delta^5$-3,11,20-triketo-pregnene having an M. P. of 175.5–176.5° C. possesses the stereoisomeric configuration characteristic of the naturally occurring steroid hormones such as progesterone; we refer to this racemate (M. P. 175.5–176.5° C.) as dl-11-keto-progesterone.

*Example 18*

To a solution of 222 mg. of 1-ethoxyethinyl-2-methallyl-2,4b-dimethyl-7-ethylenedioxy - 1,2,3,4,4a,4b,5,6,7,8,10,10a-dodecahydrophenanthrene-1,4-diol (M. P. 108–111° C.) in 2 ml. of tetrahydrofuran was added 0.008 ml. of concentrated sulfuric acid. After three minutes at room temperature, an excess of sodium bicarbonate solution was added to the reaction mixture and the tetrahydrofuran was evaporated. The organic material which separated was extracted into ether; the ether extract was washed once with water, dried over magnesium sulfate and the ether was evaporated. The residual oily material was dissolved in benzene and chromatographed on acid-washed alumina. The adsorbate was eluted with mixtures of ether and petroleum ether; upon evaporation of the 2:8 ether-petroleum ether eluate there was obtained 1-carbethoxymethylene-2-methallyl-2,4b-dimethyl-7 - ethylenedioxy-1,2,3,4,4a,4b,5,6,7,8,10,10a -dodechaydrophenanthrene-4-ol which melted at 105–120° C. after purification by recrystallization from ether-petroleum ether.

*Example 19*

A suspension of 60 mg. of 1-carbethoxymethylene-2-methallyl-2,4b-dimethyl-7-ethylenedioxy-1,2,3,4,4a,4b,5,6,7,8,10,10a-dodecahydrophenanthrene-4-ol (M. P. 105–120° C.) in 5 ml. of methanol and 5 ml. of water containing 0.5 g. of potassium carbonate and 1 ml. of 1 N potassium hydroxide was heated under reflux for three hours. The methanol was evaporated under reduced pressure and the aqueous residue was diluted with water and extracted with ether to remove any neutral material. The aqueous solution was acidified with excess sodium dihydrogen phosphate and the acidified mixture was extracted with chloroform. After drying over magnesium sulfate, the chloroform extract was filtered and evaporated to dryness under reduced pressure. The residual material was crystallized from benzene-petroleum ether to give substantially pure 1-carboxymethylene-2-methallyl-2,4b-dimethyl-7-ethylenedioxy - 1,2,3,4,4a,4b,5,6,7,8,10,10a-dodecahydrophenanthrene-4-ol melting at 174–180° C.

Treatment of the 1-carboxymethylene-2-methallyl-2,4b-dimethyl - 7-ethylenedioxy-1,2,3,4,4a,4b,5,6,7,8,10,10a-dodecahydrophenanthrene-4-ol with a slight excess of diazomethane in ether solution gave 1-carbomethoxymethylene-2-methallyl-2,4b-dimethyl-7-ethylenedioxy-1,2,3,4,4a,4b,5,6,7,8,10,10a-dodecahydrophenanthrene-4-ol, M. P. 134–135° C.

Oxidation of the 1-carbomethoxymethylene-2-methallyl-2,4b-dimethyl - 7 - ethylenedioxy-1,2,3,4,4a,4b,5,6,7,8,10,10a-dodecahydrophenanthrene-4-ol (M. P. 134–135° C.) with chromic anhydride and pyridine gave a stereoisomer of 1 - carbomethoxymethylene-2-methallyl-2,4b-dimethyl-7-ethylenedioxy-1,2,3,4,4a,4b,5,6,7,8,10,10a-dodecahydrophenanthrene-4-one M. P. 150–153° C.

*Example 20*

A solution of 229 mg. of 1-carboxymethylene-2-methallyl - 2,4b-dimethyl-7-ethylenedioxy-1,2,3,4,4a,4b,5,6,7,8,10,10a-dodecahydrophenanthrene-4-ol in 5 ml. of ether was added to a solution of 40 mg. of lithium in 10 ml. of liquid ammonia at —78° C. The liquid ammonia reaction mixture was allowed to warm to —40° C. with stirring. After twenty minutes the blue lithium color was discharged. An additional 40 mg. of lithium was added and the mixture was stirred at —40° C. for an additional hour. The excess ammonia was evaporated from the reaction mixture at room temperature and 5 ml. of ether was added. Ethyl acetate was then added cautiously to destroy the excess lithium. Water was added to the mixture and the ether layer was discarded. The alkaline aqueous layer was acidified with excess sodium dihydrogen phosphate and the acidic product was extracted with chloroform. The chloroform extract was washed with water, dried over magnesium sulfate, filtered, and the chloroform evaporated under reduced pressure. Crystallization of the residue from benzene gave substantially pure 1-carboxymethyl-2-methallyl-2,4b-dimethyl-7-ethylenedioxy - 1,2,3,4,4a,4b,5,6,7,8,10,10a-dodecahydrophenanthrene-4-ol melting at 195–197° C.

Oxidation of the 1-carboxymethyl-2-methallyl-2,4b-dimethyl - 7-ethylenedioxy-1,2,3,4,4a,4b,5,6,7,8,10,10a-dodecahydrophenanthrene-4-ol with chromic anhydride and pyridine gave 1-carboxymethyl-2-methallyl-2,4b-dimethyl-7-ethylenedioxy-1,2,3,4,4a,4b,5,6,7,8,10,10a-dodecahydrophenanthrene-4-one.

Treatment of the 1-carboxymethyl-2-methallyl-2,4b-dimethyl - 7-ethylenedioxy-1,2,3,4,4a,4b,5,6,7,8,10,10a-dodecahydrophenanthrene-4-ol with a slight excess of diazomethane in ether solution gave 1-carbomethoxy-methyl-2-methallyl-2,4b-dimethyl-1-ethylenedioxy - 1,2,3,4,4a,4b,-5,6,7,8,10,10a-dodecahydrophenanthrene-4-ol; M. P. 142–144° C.

*Example 21*

One gram of 1-carboxymethyl-2-methallyl-2,4b-dimethyl-7-ethylenedioxy - 1,2,3,4,4a,4b,5,6,7,8,10,10a - dodecahydrophenanthrene-4-one was dissolved in 30 ml. of water containing 1.1 ml. of 4 N aqueous sodium hydroxide and 10 ml. of ethanol. One gram of sodium borohydride was added, and the solution was allowed to stand at room temperature overnight. One more gram of sodium borohydride was added, and the solution was boiled 1½ hours. It was poured into ice water, and acidified with excess sodium dihydrogen phosphate. The acid mixture was extracted twice with chloroform, the combined extracts were evaporated, and the amorphous residue was crystallized from ether. Recrystallization from ethyl acetate and from tetrahydrofuran-petroleum ether afforded 1-carboxymethyl-2-methallyl-2,4b-dimethyl-7 - ethylenedioxy - 1,2,3,4,4a,4b,5,6,7,8,10,10a-dodecahydrophenanthrene-4-ol, M. P. 167–169° C.

*Example 22*

To a solution of 20.7 g. of 1-ethoxyethinyl-2-allyl-2,4b-dimethyl - 7 - ethylenedioxy - 1,2,3,4,4a,4b,5,6,7,8,10,10a-dodecahydrophenanthrene - 1 - ol - 4 - one (M. P. 83.5–85.0° C.) in 165 ml. of absolute tetrahydrofuran was added 12.0 ml. of 10% aqueous sulfuric acid. The temperature of the solution was maintained at a temperature of 28–30° C. for a period of three and one-half hours. After the first 45 minutes had elapsed, there was added 0.17 ml. of pyridine, and the reaction mixture was stirred for the remaining time. The reaction was quenched by the addition of excess aqueous sodium bicarbonate. The organic solvent was distilled off in vacuo and the remaining material extracted with ether. The extract was washed with water, dried over magnesium sulfate, and concentrated to dryness. Chromatography of the oily residue over 800 g. of alkaline alumina yielded 1-carboethoxy-methylene-2-allyl-2,4b-dimethyl-7-ethylenedioxy - 1,2,3,4,4a,4b,5,6,7,8,10,10a - dodecahydrophenanthrene-4-one, an amorphous solid. Further elution provided 1-carboethoxymethyl - 2 - allyl - 2,4b - dimethyl - 7 - ethylenedioxy-1,2,3,4,4a,4b,5,6,7,8,10,10a-dodecahydrophenanthrene - 1-ol-4-one, M. P. 99–101° C.

In accordance with the above method, and using the stereoisomer of 1-ethoxyethinyl-2-allyl-2,4b-dimethyl-7-ethylenedioxy - 1,2,3,4,4a,4b,5,6,7,8,10,10a - dodecahydrophenanthrene - 1 - ol-4-one melting at 159–160° C., there was obtained the stereoisomer of 1-carboethoxymethyl - 2 - allyl - 2,4b-dimethyl - 7 - ethylenedioxy-1,2,3, 4,4a,4b,5,6,7,8,10,10a - dodecahydrophenanthrene - 1 - ol-4-one, M. P. 101° C.

*Example 23*

A solution of 175 mg. of 1-carboethoxymethylene-2-allyl - 2,4b - dimethyl - 7 - ethylenedioxy - 1,2,3,4,4a,4b, 5,6,7,8,10,10a-dodecahydrophenanthrene-4-one in 2.9 ml. of methanol was treated with a solution of 0.37 g. of potassium carbonate in 2.7 ml. of water. The resulting mixture was heated to boiling under reflux for a period of two and one-half hours. The methanol was removed under reduced pressure and the aqueous solution acidified with excess sodium dihydrogen phosphate. An ether extraction was made of the solution, and the extract washed with water, dried over magnesium sulfate, and concentrated in vacuo. The resulting oil crystallized from petroleum ether and was recrystallized from benzene-petroleum ether to give pure 1-carboxymethylene-2-allyl-2,4b - dimethyl - 7 - ethylenedioxy - 1,2,3,4,4a,4b,5,6,7, 8,10,-10a-dodecahydrophenanthrene-4-one, having a melting point of 163–164° C.

*Example 24*

A suspension of 14.2 g. of 1-carboxymethylene-2-allyl-2,4b - dimethyl - 7 - ethylenedioxy - 1,2,3,4,4a,4b,5,6,7, 8,10,10a-dodecahydrophenanthrene-4-one (M. P. 163–164° C.) in 225 ml. of water was dissolved by adding one molar equivalent of aqueous sodium hydroxide. To this solution was added 21 g. of sodium borohydride, and the mixture was allowed to stand overnight. The reaction mixture was then heated at 100° C. for one hour, cooled, and acidified with sodium dihydrogen phosphate. Extraction of the aqueous solution with chloroform, followed by washing the extract with water, drying over magnesium sulfate, and concentrating to dryness under reduced pressure gave 1-carboxymethylene-2-allyl-2,4b-dimethyl - 7 - ethylenedioxy - 1,2,3,4,4a,4b,5,6,7,8,10,10a-dodecahydrophenanthrene-4-ol, an amorphous solid.

*Example 25*

1 - carboxymethylene - 2 - allyl - 2,4b - dimethyl - 7-ethylenedioxy - 1,2,3,4,4a,4b,5,6,7,8,10,10a - dodecahydrophenanthrene-4-one (15 g. of amorphous material) was added to one liter of anhydrous ammonia cooled to a temperature of −60° C. followed by the addition of 15 g. of metallic potassium. There was then introduced 50 ml. of anhydrous isopropanol over a period of five minutes. The mixture was stirred until the reaction was over as evidenced by the disappearance of the blue color characteristic of metallic potassium in liquid ammonia. The ammonia was allowed to evaporate overnight. The remaining solution was then concentrated almost to dryness under reduced pressure. Two hundred milliliters of water were added followed by addition of a solution of 70 g. of sodium dihydrogen phosphate and 50 g. of 85% phosphoric acid in 500 ml. of water. The crystalline material thus obtained was filtered and washed thoroughly with water, yielding 1-carboxymethyl-2-allyl-2,4b-dimethyl - 7 - ethylenedioxy - 1,2,3,4,4a,4b,5,6,7,8,10,10a-dodecahydrophenanthrene-4-ol, M. P. 235.5–236.0° C.

*Example 26*

To a solution of 10.90 g. of 1-carboxymethyl-2-allyl-2,4b - dimethyl - 7 - ethylenedioxy - 1,2,3,4,4a,4b,5,6,7, 8,10,10a-dodecahydrophenanthrene-4-ol (M. P. 235.5–236.0° C.) in one liter of absolute tetrahydrofuran was added an excess of diazomethane in ether. After standing overnight at room temperature, the solvents were removed by evaporation, and the residual material crystallized from ethyl acetate-petroleum ether to give substantially pure 1-carbomethoxymethyl-2-allyl-2,4b-dimethyl-7 - ethylenedioxy - 1,2,3,4,4a,4b,5,6,7,8,10,10a - dodecahydrophenanthrene-4-ol, M. P. 113–115° C. Recrystallization of this material from aqueous methanol gave a second crystalline modification, M. P. 130–132° C.

*Example 27*

A mixture of 15.80 g. of 1-carboxymethyl-2-allyl-2,4b-dimethyl - 7 - ethylenedioxy - 1,2,3,4,4a,4b,5,6,7,8,10,10a-dodecahydrophenanthrene-4-ol and 40 g. of anhydrous potassium carbonate in 450 ml. of acetone and 40 ml. of methyl iodide was stirred at room temperature for 42 hours. The solvent was then distilled off under reduced pressure and the residue treated with 100 ml. of water. The mixture was then extracted with chloroform, the extract washed with water, dried over magnesium sulfate, and concentrated to dryness in vacuo. The residual oil was taken up in a small volume of methanol and crystallized by addition of water, to give substantially pure 1-carbomethoxymethyl - 2 - allyl - 2,4b - dimethyl - 7 - ethylenedioxy - 1,2,3,4,4a,4b,5,6,7,8,10,10a - dodecahydrophenanthrene-4-ol.

*Example 28*

A solution of 9.35 g. of 1-carbomethoxymethyl-2-allyl-2,4b-dimethyl - 7 - ethylenedioxy-1,2,3,4,4a,4b,5,6,7,8,10,10a-dodecahydrophenanthrene-4-ol in 100 ml. of pyridine was added to the complex formed by adding 10 g. of chromium trioxide to 100 ml. of pyridine. After standing at room temperature overnight, the resulting mixture was diluted with an equal volume of water. The solution was then extracted with ether, and the extract washed with water, dried over magnesium sulfate, and concentrated to about 100 ml. One hundred milliliters of methanol were then added followed by addition of 500 ml. of water. The material which crystallized was filtered and dried to give 1-carbomethoxymethyl-2-allyl-2,4b-dimethyl - 7 - ethylenedioxy-1,2,3,4,4a,4b,5,6,7,8,10,10a-dodecahydrophenanthrene-4-one crystallized; M. P. 108–109° C.

*Example 29*

To a solution of 400 mg. of 1-carbomethoxymethyl-2-allyl-2,4b-dimethyl - 7 - ethylenedioxy-1,2,3,4,4a,4b,5,6,7,8,10,10a-dodecahydrophenanthrene-4-one in 4 ml. of anhydrous ether was added 280 mg. of osmium tetroxide. The resulting mixture was stirred at room temperature for 45 minutes. To the mixture was added 20 ml. of ethanol and a solution of 1.7 g. of sodium sulfite in 11 ml. of water. The solution was shaken for 20 minutes and then filtered. The filtrate was concentrated to about 10 ml. and extracted with chloroform. The extract was washed with water, dried over magnesium sulfate, and concentrated to dryness in vacuo. Crystallization of the residue from benzene-petroleum ether gave 1-carbomethoxymethyl-2-(beta, gamma-dihydroxypropyl)-2,4b-dimethyl-7-ethylenedioxy-1,2,3,4,4a,4b,5,6,7,8,10,10a-dodecahydrophenanthrene-4-one, M. P. 163–164° C. Acidification of the aqueous layer from the chloroform extraction with excess sodium dihydrogen phosphate and extraction with chloroform followed by washing the extract with water, drying over magnesium sulfate, and concentrating to dryness in vacuo, provided 1-carbomethoxymethyl-2-(beta, gamma-dihydroxypropyl) - 2,4b - dimethyl - 7 - ethylenedioxy - 1,2,3,4,4a,4b,5,6,7,8,10,10a - dodecahydrophenanthrene-4-one, which after recrystallization from pyridine-petroleum ether decomposed at 228° C.

*Example 30*

Two hundred milligrams of 1-carboethoxymethyl-2-methallyl-2,4b-dimethyl - 7 - ethylenedioxy-1,2,3,4,4a,4b,5,6,7,8,10,10a-dodecahydrophenanthrene-1-ol-4-one in 5 ml. of acetone were treated with 5 drops of 10% hydrochloric acid and heated under reflux twenty minutes. The product was crystallized from ether to give 1-carboethoxymethyl - 2 - methallyl-2,4b-dimethyl-1,2,3,4,4a,4b,5,6,7,9,10,10a - dodecahydrophenanthrene-1-ol-4,7-dione, M. P. 122–124° C.

*Example 31*

Three hundred milligrams of 1-carboethoxymethyl-2-methallyl-2,4b-dimethyl - 7 - ethylenedioxy-1,2,3,4,4a,4b,5,6,7,8,10,10a-dodecahydrophenanthrene-1-ol-4-one were heated in 10 ml. of 2 N potassium carbonate in 50% aqueous methanol under reflux for seven hours. The methanol was removed in vacuo and the resulting alkaline solution was washed with ether. The washed alkaline solution was then acidified with excess sodium dihydrogen phosphate followed by extraction with chloroform, drying and concentration to give crystalline 1-carboxymethyl - 2 - methallyl-2,4b-dimethyl-7-ethylenedioxy-1,2,3,4,4a,4b,5,6,7,8,10,10a - dodecahydrophenanthrene-1-ol-4-one after crystallization from ethyl acetate; M. P. 213–215° C. This compound was heated for a short while in acetone and a trace of hydrochloric acid. Dilution with water gave 1-carboxymethyl-2-methallyl-2,4b-dimethyl - 1,2,3,4,4a,5,6,7,9,10,10a - dodecahydrophenanthrene-1-ol-4,7-dione; M. P. 205–210° C. (dec.).

*Example 32*

The stereoisomer of 1-carboethoxymethylene-2-methallyl-2,4b-dimethyl - 7 - ethylenedioxy-1,2,3,4,4a,4b,5,6,7,8,10,10a-dodecahydrophenanthrene-4-one (M. P. 94–96° C.) was hydrolyzed as in Example 30 to give the stereoisomer of 1 - carboethoxymethylene-2-methallyl-2,4b-dimethyl - 1,2,3,4,4a,4b,5,6,7,9,10,10a-dodecahydrophenanthrene-4,7-dione; M. P. 111–112° C.

*Example 33*

The stereoisomer of 1-carboxymethylene-2-methallyl-2,4b-dimethyl - 7 - ethylenedioxy-1,2,3,4,4a,4b,5,6,7,8,10,10a-dodecahydrophenanthrene-4-one (M. P. 203–205° C.) was treated with diazomethane in ethyl ether to produce the corresponding stereoisomer of 1-carbomethoxymethylene-2-methallyl-2,4b-dimethyl - 7 - ethylenedioxy-1,2,3,4,4a,5,6,7,8,10,10a-dodecahydrophenanthrene-4-one; M. P. 152–153.5° C.

*Example 34*

Treatment of 1-carbomethoxymethyl-2-methallyl-2,4b-dimethyl - 7 - ethylenedioxy-1,2,3,4,4a,4b,5,6,7,8,10,10a-dodecahydrophenanthrene-4-ol (M. P. 157–158° C.) with acetyl chloride in pyridine gave 1-carbomethoxymethyl-2-methallyl-2,4b-dimethyl - 4 - acetoxy-7-ethylenedioxy-1,2,3,4,4a,4b,5,6,7,8,10,10a-dodecahydrophenanthrene; M. P. 140–141° C.

Treatment of 1-carbomethoxymethyl-2,4b-dimethyl - 7 - ethylenedioxy - 1,2,3,4,4a,4b,5,6,7,8,10,10a-dodecahydrophenanthrene-4-ol (M. P. 83–85° C.) with acetyl chloride in pyridine gave 1-carbomethoxymethyl-2-methallyl-2,4b-dimethyl - 4 - acetoxy-7-ethylenedioxy-1,2,3,4,4a,4b,5,6,7,8,10,10a-dodecahydrophenanthrene; M. P. 125–126° C.

Treatment of 1-carboxymethylene-2-methallyl-2,4b-dimethyl - 7 - ethylenedioxy - 1,2,3,4,4a,4b,5,6,7,8,10,10a-dodecahydrophenanthrene-4-ol (M. P. 211–214° C.) with acetyl chloride in pyridine gave 1-carboxymethylene-2-methallyl-2,4b-dimethyl-4-acetoxy - 7 - ethylenedioxy-1,2,3,4,4a,4b,5,6,7,8,10,10a-dodecahydrophenanthrene; M. P. 125–126° C.

*Example 35*

One quarter milliliter of 10% sulfuric acid was added to a solution of 140 mg. of 1-ethoxyethinyl-2-methallyl - 2,4b - dimethyl - 7 - ethylenedioxy - 1,2,3,4,4a,4b,5,6,7,8,10,10a - dodecahydrophenanthrene - 1 - ol - 4 - one (M. P. of 159–161° C.) in 4 ml. of tetrahydrofuran. After seven hours at room temperature the reaction mixture was poured into excess sodium bicarbonate solution and the tetrahydrofuran removed in vacuo. The product was extracted with ether and chromatographed over 4.5 g. of alkaline alumina. With 7:3 petroleum ether:ether there was eluted 1-carboethoxymethyl-2-methallyl - 2,4b - dimethyl - 7 - ethylenedioxy - 1,2,3,4,4a,4b,5,6,7,8,10,10a-dodecahydrophenanthrene-1-ol - 4 - one. After recrystallization from petroleum ether the crystalline product had a melting point of 118–119° C.

*Example 36*

0.9 cc. of ethanedithiol was added to a cooled mixture of sulfate and .9 g. of 1-carbomethoxymethyl-2-methallyl - 2,4b - dimethyl - 4,7 - diketo - 1,2,3,4,4a,4b,5,6,7,9,10,10a-dodecahydrophenanthrene. After standing at room temperature for 3 days, the reaction mixture was extracted with ether. Evaporation of the ethereal extract gave a crystalline residue which, upon recrystallization, from ether-petroleum ether gave crystalline 1-carbomethoxymethyl - 2 - methallyl - 2,4b - dimethyl-1,2,3,4,4a,4b,5,6,7,9,10,10a - dodecahydrophenanthrene - 4,7 - dione - 7-ethylenemercaptol.

The parent 7-ketone may be regenerated by treating this product with a dilute solution of hydrochloric acid in acetone.

Example 37

A solution of 4 g. of 2-carbomethoxymethyl-2-methallyl - 2,4b - dimethyl - 1,2,3,4,4a,4b,5,6,7,9,10,10a-dodecahydrophenanthrene - 4,7 - dione in 15 ml. of dioxane was treated with 4 g. of β-mercaptoethanol, followed by the addition of 5 g. of freshly fused zinc chloride and 5 g. of anhydrous sodium sulfate. The solution was cooled initially in ice and then allowed to stand at room temperature for 3 days. After dilution with water, the reaction mixture was extracted with chloroform. The chloroform extract was washed with water until neutral, dried and the solvent evaporated in vacuo. The residual material was recrystallized from ether to give substantially pure 1-carbomethoxymethyl-2-methallyl - 2,4b - dimethyl-1,2,3,4,4a,4b,5,6,7,8,10,10a - dodecahydrophenanthrene - 4,7-dione - 7 - ethylenehemithioketal. The hemithioketal, prepared according to the foregoing procedure, exhibits substantially no absorption in the ultraviolet.

The parent ketone may be reformed by treatment with acetone-hydrochloric acid.

The 1-ethoxyethinyl - 2 - methallyl - 2,4b - dimethyl - 7-ethylenedioxy- 1,2,3,4,4a,4b,5,6,7,8,10,10a - dodecahydrophenanthrene-1-ol-4-one used as starting material in Example 1 hereinabove can be prepared from 7-keto-4b-methyl-1,2,3,4,4a,4b,5,6,7,9,10,10a - dodecahydrophenanthrene-1,4-diol (the preparation of which is described in Patent No. 2,617,828, issued November 11, 1952), in accordance with the following procedure:

Into a 5 liter flask equipped with a stirrer, a 1 liter dropping funnel and a sidearm with condenser attached in distilling position, were placed 38.9 g. (0.155 mole) of 4b-methyl-1,2,3,4,4a,5,6,7,9,10,10a - dodecahydrophenanthrene-1,4-diol-7-one. 40 cc. (0.645 mole) of glycol, 2,500 cc. of ethylene dichloride and 0.4 g. (0.002 mole) of p-toluene sulfonic acid. This mixture was set stirring. Enough heat was applied to distill off 3 liters of the azeotrope of the solvent and water, formed as a by-product, during the 3-hour period. During this time an additional 1,500 cc. of ethylene dichloride was added to keep the reactants in solution. After 3 hours the reaction mixture was cooled and thoroughly shaken with 50 cc. of an aqueous 1 Normal potassium bicarbonate solution. The aqueous carbonate layer was drawn off and twice extracted with ethylene dichloride. All three ethylene dichloride extracts were then combined, dried over anhydrous magnesium sulfate and concentrated. This concentrate was taken up in 1 liter of acetone and concentrated until crystals just began to come out. Filtration of the cold acetone gives the crude crystalline product 4b-methyl-7-ethylenedioxy - 1,2,3,4,4a,4b,5,6,7,8,10,10a-dodecahydrophenanthrene-1,4-diol which can be further purified by recrystallization from acetone. The pure product melts at 189° C.

Eighty-six and five tenths grams (0.294 mole) of 4b-methyl-7 - ethylenedioxy - 1,2,3,4,4a,4b,5,6,7,8,10,10a-dodecahydrophenanthrene-1,4-diol was dissolved in 2,130 g. (2,250 cc.) (21.7 moles) of cyclohexanone, and 2,250 cc. of benzene. To this solution was added 86.5 g. (0.424 mole) of aluminum isopropoxide, and the whole was then set to reflux for 12 hours. At the end of this time 25 cc. of water was added. The coagulated aluminum hydroxide thus formed was filtered off. The filtrate was concentrated and dried in vacuo, leaving a residue which, on trituration with petroleum ether, gave the crude crystalline product 4b-methyl-7-ethylenedioxy - 1,2,3,4,4a,4b,5,6,7,8,10,10a - dodecahydrophenanthrene-4-ol-1-one. It can be purified by recrystallization from acetone and melts at 219–220° C.

To 10.0 g. of 4b-methyl-7-ethylenedioxy-1,2,3,4,4a,4b,5,6,7,8,10,10a - dodecahydrophenanthrene-4-ol-1-one dissolved in 120 ml. of benzene and 70 ml. of t-butyl alcohol was added, at reflux temperature, 1.5 equivalents of 1 M potassium t-butoxide in t-butyl alcohol, and 20 ml. of a 1:1 solution of methyl iodide in benzene. After 30 minutes of refluxing, the solution was quenched with water, concentrated in vacuo, and the concentrate extracted with $CHCl_3$. The $CHCl_3$ extract was dried and the solvent removed in vacuo. Fractional crystallization of the crystalline residue from ethyl acetate, yielded the desired product, 2,4b-dimethyl-7 - ethylenedioxy - 1,2,3,4,4a,4b,5,6,7,8,10,10a - dodecahydrophenanthrene - 4 - ol - 1 - one, M. P. 189–192° C.

A solution of 3.12 g. of 2,4b-dimethyl-7-ethylenedioxy-1,2,3,4,4a,4b,5,6,7,8,10,10a - dodecahydrophenanthrene-1-one-4-ol (M. P. 189–192° C.) in 30 cc. of pyridine was combined with 3.1 g. of chromium trioxide in 30 cc. of pyridine. The reaction flask was stoppered, the contents mixed thoroughly and allowed to stand at room temperature overnight. The reaction mixture was poured into water and extracted with three portions of benzene-ether (1:1) with filtration through diatomaceous earth to break the emulsions. After washing with water the combined organic solution was dried over anhydrous magnesium sulfate and concentrated with final drying of the residue under vacuum. Crystallization from ether gave crystalline 2,4b-dimethyl-7-ethylenedioxy-1,2,3,4,4a,4b,5,6,7,8,10,10a - dodecahydrophenanthrene - 1,4 - dione M. P. 130–145° C. Chromatography over alumina and elution with petroleum ether-ether (8:2) gave two purified isomers, M. P. 135–136° C. and 152–153° C.

A solution of 16.0 g. of crude 2,4b-dimethyl-7-ethylenedioxy - 1,2,3,4,4a,4b,5,6,7,8,10,10a - dodecahydrophenanthrene-1,4-dione (M. P. 130–145° C. and consisting of a mixture of isomers M. P. 135–136° C. and 152–153° C.) in 190 cc. of benzene was concentrated to 160 cc. to insure dryness. The solution was then placed under nitrogen, and treated successively with 16.0 cc. of methallyl iodide and 70 cc. of tertiary butyl alcohol containing 2.31 g. of dissolved potassium. After standing at room temperature for three hours, the mixture was poured into ether, the ethereal solution washed with water, concentrated to dryness and purified by chromatography on either acid washed or alkaline alumina, the product being eluted with petroleum ether-ether mixtures. Pure 2,4b-dimethyl-2-methallyl-7-ethylenedioxy-1,2,3,4,4a,4b,5,6,7,8,10,10a - dodecahydrophenanthrene-1,4-dione was obtained, M. P. 108–109° C.

Another isomeric form of this compound having a melting point of 138–139° C. was also recovered from the chromatographic column.

A solution of ethyl magnesium bromide (0.1526 m.) was prepared in the usual manner from 3.7 g. of magnesium and excess ethyl bromide in 100 ml. of dry ether. A solution of 11.74 g. of ethoxyacetylene (0.165 m.) diluted with dry ether to a total volume of 40 ml. was added gradually to the ethyl Grignard and stirred until the evolution of ethane ceased. 120 ml. of dry benzene was added to dissolve the ethoxyacetylene magnesium bromide.

A solution of 27 g. of dry 2,4b-dimethyl-2-methallyl-7 - ethylenedioxy - 1,2,3,4,4a,4b,5,6,7,8,10,10a - dodecahydrophenanthrene-1,4-dione (stereoisomer of M. P. 108–109° C.) in 150 ml. of dry benzene was added rapidly to the stirred Grignard solution. After standing at room temperature for two hours, the reaction mixture was decomposed by pouring into ice water. Enough saturated aqueous ammonium chloride was added to break the emulsion which formed. The benzene-ether layer was separated and washed once with water. The aqueous layer was extracted again with 500 ml. of a 1:1 benzene-ether solution which, after one water wash, was combined with the original extract. After drying over anhydrous sodium sulfate and removal of the latter by filtration, the solvents were distilled in vacuo. From a solution of the residual oil in ether were obtained crystals of the stereoisomer of 1-ethoxyethinyl-2,4b-dimethyl - 2 - methallyl - 7 - ethylenedioxy - 1,2,3,4,4a, 4b,5,6,7,8,10,10a - dodecahydrophenanthrene - 1 - ol - 4-one having an M. P. of 133–134° C.

By using a stereochemical modification of the above starting material, M. P. 138–139° C., and treating as above described, there was obtained the stereochemical modification of 1-ethoxyethinyl-2,4b-dimethyl-2-methallyl - 7 - ethylenedioxy - 1,2,3,4,4a,4b,5,6,7,8,10,10a-dodecahydrophenanthrene-1-ol-4-one having an M. P. of 131–132° C.

The 1 - ethoxyethinyl - 2 - allyl - 2,4b - dimethyl - 7-ethylenedioxy - 1,2,3,4,4a,4b,5,6,7,8,10,10a - dodecahydrophenanthrene-1-ol-4-one used as starting material in Example 22 hereinabove can be prepared from 2,4b-dimethyl - 7 - ethylenedioxy - 1,2,3,4,4a,4b,5,6,7,8,10,10a-dodecahydrophenanthrene-1,4-dione (the preparation of which is described hereinabove) in accordance with the following procedure:

To a solution containing 4.0 g. of 2,4b-dimethyl-7-ethylenedioxy - 1,2,3,4,4a,4b,5,6,7,8,10,10a - dodecahydrophenanthrene-1,4-dione dissolved in 50 ml. of anhydrous benzene is added 20 ml. of a 1 M solution of potassium t-butoxide in t-butyl alcohol and 3 ml. of allyl iodide. The resulting solution is allowed to stand at room temperature for a period of approximately one hour, at the end of which time ice water is added to the reaction mixture. The aqueous mixture is extracted with ether, and the ethereal extract is evaporated to dryness. The residual crystalline material is dissolved in benzene-petroleum ether, and the solution is chromatographed on acid-washed alumina, and the chromatogram is eluted with ether-petroleum ether. The solvents are evaporated from this ether-petroleum ether eluate to give 2-allyl-2,4b - dimethyl - 7 - ethylenedioxy - 1,2,3,4,4a,4b,5,6,7, 8,10,10a-dodecahydrophenanthrene-1,4-dione.

To an ethereal solution of 2.2 molar equivalents of ethoxyacetylene magnesium bromide was added 37.5 g. of 2 - allyl - 2,4b - dimethyl - 7 - ethylenedioxy - 1,2,3,4, 4a,4b,5,6,7,8,10,10a - dodecahydrophenanthrene - 1,4-dione in 950 ml. of benzene. The reaction mixture was stirred for 2½ hours at room temperature. It was then poured onto ice water and extracted with ether. The extract was washed with water, dried, and concentrated in vacuo. The non-crystalline residue was chromatographed on 1.6 kg. of alkaline alumina. With petroleum ether-ether eluates there was eluted first 1-ethoxyethinyl - 2 - allyl - 2,4b - dimethyl - 7 - ethylenedioxy-1,2,3,4,4a,4b,5,6,7,8,10,10a - dodecahydrophenanthrene-1-ol-4-one, melting at 83.5–85.0° C. after recrystallization from ether-petroleum ether. Further elution gave a stereoisomer of this substance, M. P. 159–160° C.

Various changes and modifications may be made in carrying out the present invention without departing from the spirit and scope thereof. Insofar as these changes and modifications are within the purview of the annexed claims, they are to be considered as part of this invention.

We claim:

1. The process which comprises reacting 1-carboalkoxymethyl - 2 - acetonyl - 2,4b - dimethyl - 4 - keto - 1,2,3, 4,4a,4b,5,6,7,8,10,10a - dodecahydrophenanthrene 7-ketal with a strong alkali under anhydrous conditions to produce $\Delta^5$-11,16,20-triketo-pregnene 3-ketal.

2. The process which comprises reacting 1-carboalkoxy - methyl - 2 - acetonyl - 2,4b - dimethyl - 4 - keto-1,2,3,4,4a,4b,5,6,7,8,10,10a - dodecahydrophenanthrene 7-cyclic ketal with a strong alkali under anhydrous conditions to produce $\Delta^5$-11,16,20-triketo-pregnene 3-cyclic ketal.

3. The process which comprises reacting 1-carboalkoxy - methyl - 2 - acetonyl - 2,4b - dimethyl - 4 - keto-7 - ethylenedioxy - 1,2,3,4,4a,4b,5,6,7,8,10,10a - dodecahydrophenanthrene with a strong alkali under anhydrous conditions to produce $\Delta^5$-3-ethylenedioxy-11,16,20-triketo-pregnene.

4. The process which comprises reacting 1-carbomethoxy - methyl - 2 - acetonyl - 2,4b - dimethyl - 4 - keto-7 - ethylenedioxy - 1,2,3,4,4a,4b,5,6,7,8,10,10a - dodecahydrophenanthrene with solid dry sodium methoxide in contact with a liquid medium comprising substantially anhydrous benzene to form $\Delta^5$-3-ethylenedioxy-11,16,20-triketo-pregnene.

5. $\Delta^5$-11,16,20-triketo-pregnene 3-keto.

6. $\Delta^5$-3-ethylenedioxy-11,16,20-triketo-pregnene.

No references cited.